US012164846B2

(12) United States Patent
Gerzen et al.

(10) Patent No.: US 12,164,846 B2
(45) Date of Patent: Dec. 10, 2024

(54) GEOMETRICAL DIMENSIONALITY CONTROL IN OPTIMIZATION

(71) Applicant: Dassault Systemes Simulia Corp., Johnston, RI (US)

(72) Inventors: Nikolai Gerzen, Karlsruhe (DE); Claus Bech Wittendorf Pedersen, Hamburg (DE); Thorsten Horst Henryk Michalski, Karlsruhe (DE)

(73) Assignee: Dassault Systemes Americas Corp., Waltham, MA (US)

( * ) Notice: Subject to any disclaimer, the term of this patent is extended or adjusted under 35 U.S.C. 154(b) by 435 days.

(21) Appl. No.: 17/114,577

(22) Filed: Dec. 8, 2020

(65) Prior Publication Data
US 2021/0173979 A1    Jun. 10, 2021

Related U.S. Application Data

(60) Provisional application No. 62/945,961, filed on Dec. 10, 2019.

(51) Int. Cl.
*G06F 30/23*       (2020.01)
*G06F 30/10*       (2020.01)
(Continued)

(52) U.S. Cl.
CPC ............. *G06F 30/23* (2020.01); *G06F 30/10* (2020.01); *G06T 17/20* (2013.01); *G06F 2111/04* (2020.01)

(58) Field of Classification Search
CPC ...... G06F 30/23; G06F 30/10; G06F 2111/04; G06F 30/25; G06F 30/367; G06F 30/398;
(Continued)

(56) References Cited

U.S. PATENT DOCUMENTS

2006/0259283 A1* 11/2006 Brughmans ............. G06F 30/23
703/2
2017/0023084 A1* 1/2017 Guest ........................ F16F 1/37
(Continued)

FOREIGN PATENT DOCUMENTS

| CN | 109543207 | 3/2019 |
| WO | 2018117971 | 6/2018 |
| WO | 2020056405 | 3/2020 |

OTHER PUBLICATIONS

Wu, J., Clausen, A., Sigmund, O.: Minimum compliance topology optimization of shell-infill composites for addi-tive manufacturing. Computer Methods in Applied Mechanics and Engineering 326, 358-375 (2017).

(Continued)

*Primary Examiner* — Kibrom K Gebresilassie
(74) *Attorney, Agent, or Firm* — Sheehan Phinney Bass & Green PA

(57) ABSTRACT

A computer-implemented method of automatically determining an optimized design for manufacturing a real-world object includes: defining, in memory of a computer-based processor, a finite element model representing a real-world object, the finite element comprising a plurality of elements; evaluating, with the computer-based processor, a distribution of a design variable throughout a vicinity of the finite element model, using singular value decomposition (SVD), to produce a singular value for the design variable in each respective element in the vicinity of the finite element model; defining optimization constraints for the vicinity of the finite element model based on the singular values produced from the SVD; and optimizing the finite element model with respect to the design variable by locally enforcing a geometry of the real-world object in the vicinity based on the defined optimization constraints.

26 Claims, 26 Drawing Sheets

(51) Int. Cl.
 G06T 17/20 (2006.01)
 G06F 111/04 (2020.01)
(58) Field of Classification Search
 CPC ... G06F 2111/00; G06F 2119/22; G06T 17/20
 See application file for complete search history.

(56) References Cited

U.S. PATENT DOCUMENTS

| | | | |
|---|---|---|---|
| 2017/0176975 | A1 | 6/2017 | Perdersen et al. |
| 2017/0372480 | A1 | 12/2017 | Sundaraman et al. |
| 2018/0165391 | A1* | 6/2018 | Levin ............... G06F 30/00 |
| 2021/0357555 | A1* | 11/2021 | Liu ................. G06F 30/27 |
| 2022/0405442 | A1* | 12/2022 | Schmidt ............ G06F 30/10 |

OTHER PUBLICATIONS

Bendsøe, M.P., Sigmund, O.: Topology Optimization—Theory, Methods, and Applications. Springer-Verlag Berlin Heidelberg (2004).
Bruggi, M.: On an alternative approach to stress constraints relaxation in topology optimization. Structural and Multidisciplinary Optimization 36(2), 125-141 (2008). DOI 10.1007/s00158-007-0203-6.
Carstensen, J.V., Guest, J.K.: Projection-based two-phase minimum and maximum length scale control in topology optimization. Struct Multidisc Optim 58, 1845-1860 (2018).
Dassault Systemes: SIMULIA Abaqus Documentation, version 2021x edn. (2020).
Dassault Systemes: SIMULIA Tosca Structure Documentation, version 2021x edn. (2020).
Dienemann, R., Schumacher, A., Fiebig, S.: Topology optimization for finding shell structures manufactured by deep drawing. Struct Multidisc Optim 56, 473-485 (2017).
Gersborg, A.R., Andreasen, C.S.: An explicit parameterization for casting constraints in gradient driven topology optimization. Struct Multidisc Optim 44, 875-881 (2011).
Hoffarth, M., Gerzen, N., Pedersen, C.: Alm overhang constraint in topology optimization for industrial applications (2017).
Holmberg, E., Torstenfelt, B., Klarbring, A.: Stress constrained topology optimization. Structural and Multi-disciplinary Optimization 48(1), 33-47 (2013). DOI 10.1007/s00158-012-0880-7.
Kennedy, G.J., Hicken, J.E.: Improved constraint-aggregation methods. Computer Methods in Applied Mechanics and Engineering 289, 332-354 (2015). DOI https://doi.org/10.1016/j.cma.2015.02.017.
Langelaar, M.: An additive manufacturing filter for topology optimization of print-ready designs. Struct Multidisc Optim 55, 871-883 (2017).
Langelaar, M.: Topology optimization for multi-axis machining. Computer Methods in Applied Mechanics and Engineering 351, 226-252 (2019).
Lazarov, B.S., Wang, F.: Maximum length scale in density based topology optimization. Computer Methods in Applied Mechanics and Engineering 318, 826-844 (2017).
Zhou, M., Lazarov, B.S., Wang, F., Sigmund, O.: Minimum length scale in topology optimization by geometric constraints. Computer Methods in Applied Mechanics and Engineering 293, 266-282 (2015).

Zhang, S., Norato, J.A., Gain, A.L.: A geometry projection method for the topology optimization of plate structures. Struct Multidisc Optim 54, 1173-1190 (2016).
Lazarov, B.S., Wang, F., Sigmund, O.: Length scale and manufacturability in density-based topology optimization. Archive of Applied Mechanics 86, 189-218 (2016).
Leiva, J., Watson, B., Kosaka, I.: An Analyticall Bi-Directional Growth Parameterization to Obtain Optimal Castable Topology Designs.
Luo, Y., Li, Q., Liu, S.: Topology optimization of shell-infill structures using an erosion-based interface identification method. Computer Methods in Applied Mechanics and Engineering 355, 94-112 (2019). DOI 10.1016/j.cma.2019.05.017.
Norato, J.A.: Topology optimization with supershapes. Struct Multidisc Optim 58, 415-434 (2018).
Paris, J., Navarrina, F., Colominas, I., Casteleiro, M.: Topology optimization of continuum structures with local and global stress constraints. Structural and Multi-disciplinary Optimization 39(4), 419-437 (2008). DOI 10.1007/s00158-008-0336-2.
Schmidt, M., Pedersen, C.B.W., Gout, C.: On structural topology optimization using graded porosity control. Struct Multidisc Optim 60, 1437-1453 (2019).
Sigmund, O., Aage, N., Andreassen, E.: On the (non- )optimality of michell structures. Structural and Multi-disciplinary Optimization 54(2), 361-373 (2016). DOI 10.1007/s00158-016-1420-7.
Sigmund, O., Maute, K.: Topology optimization approaches: A comparative review. Structural and Multi-disciplinary Optimization 48(6), 1031-1055 (2013). DOI 10.1007/s00158-013-0978-6.
Sigmund, O., Petersen, J.: Numerical instabilities in topology optimization: A survey on procedures dealing with checkerboards, mesh-dependencies and local minima. Structural Optimization 16, 68-75 (1998).
Stromberg, N.: Topology optimization of structures with manufacturing and unilateral contact constraints by minimizing an adjustable compliance-volume product. Struct Multidisc Optim 42, 341-350 (2010).
Vatanabe, S.L., Lippi, T.N., de Lima, C.R., Paulino, G.H., Silva, E.C.: Topology optimization with manufacturing constraints: A unified projection-based approach. Advances in Engineering Software 100, 97-112 (2016).
Verbart, A., Langelaar, M., van Keulen, F.: Damage approach: A new method for topology optimization with local stress constraints. Structural and Multidisciplinary Optimization 53(5), 1081-1098 (2015). DOI 10.1007/s00158-015-1318-9.
Wu, J., Aage, N., Westermann, R., Sigmund, O.: Infill optimization for additive manufacturing—approaching bone-like porous structures. IEEE Transactions on Visualization and Computer Graphics 24(2), 1127-1140 (2018).
Zhang, S., Gain, A.L., Norato, J.A.: A geometry projection method for the topology optimization of curved plate structures with placement bounds. International Journal for Numerical Methods in Engineering 114(2), 128-146 (2018).
Extended European Search Report for 20212830.2, dated Apr. 30, 2021.
Gerzen, Nikolai et al; "Applications of singular value decomposition in structural optimisation" Proceedings of Applied Mathematical Mechanics, vol. 9, No. 1, Dec. 1, 2009 pp. 579-580.
Stolpe, et al: "General rights Copyright and moral rights for Advances in Topology and Material Optimization—Methods and Industrial Applications Extended Abstracts" DTU Mathematics Report, Jan. 1, 2009 pp. 2009-2.

\* cited by examiner

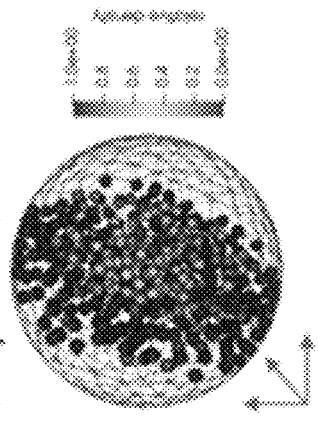
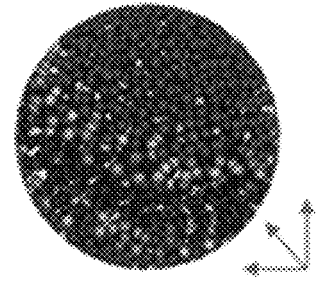
FIG. 4A  FIG. 4B
(a) Structural element  (b) Relative density field
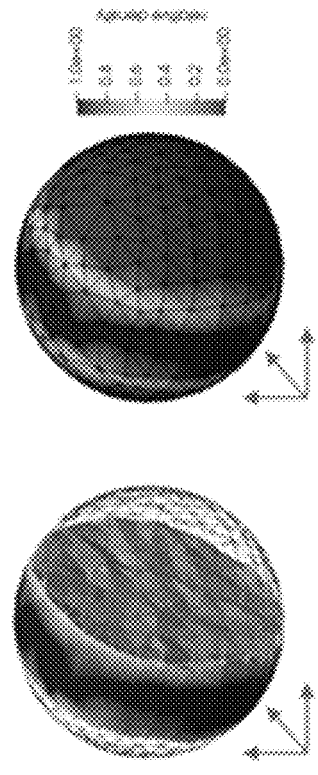
FIG. 4C  FIG. 4D
(c) Elemental centroids  (d) Coordinates of centroids scaled by relative densities
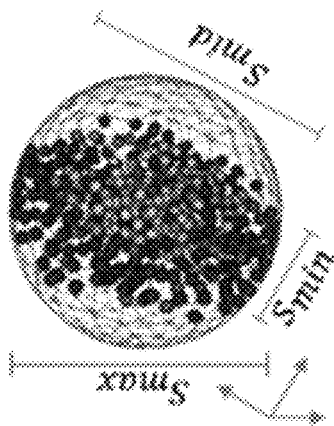
FIG. 4E
(e) SVD of points cloud

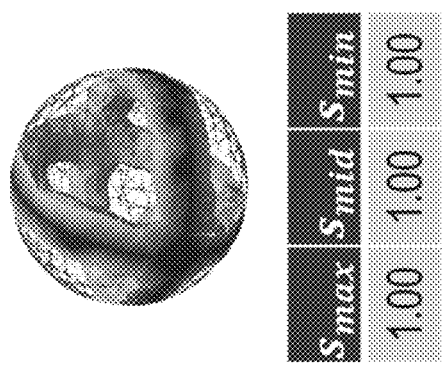
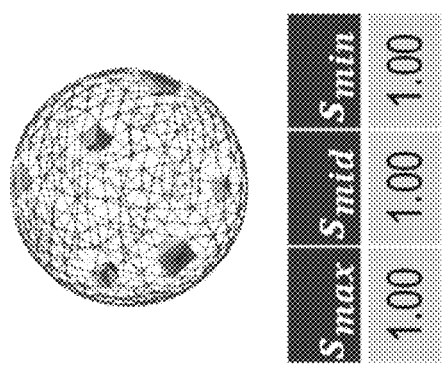
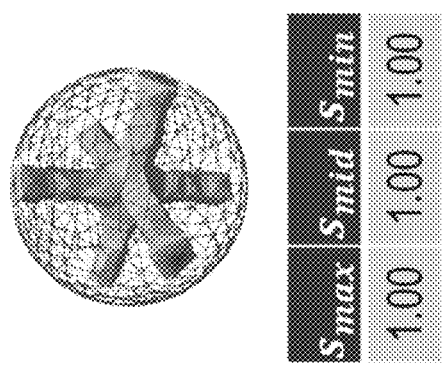
FIG. 10

Diameter of 10 for calculating SVD

Loading (applied force)

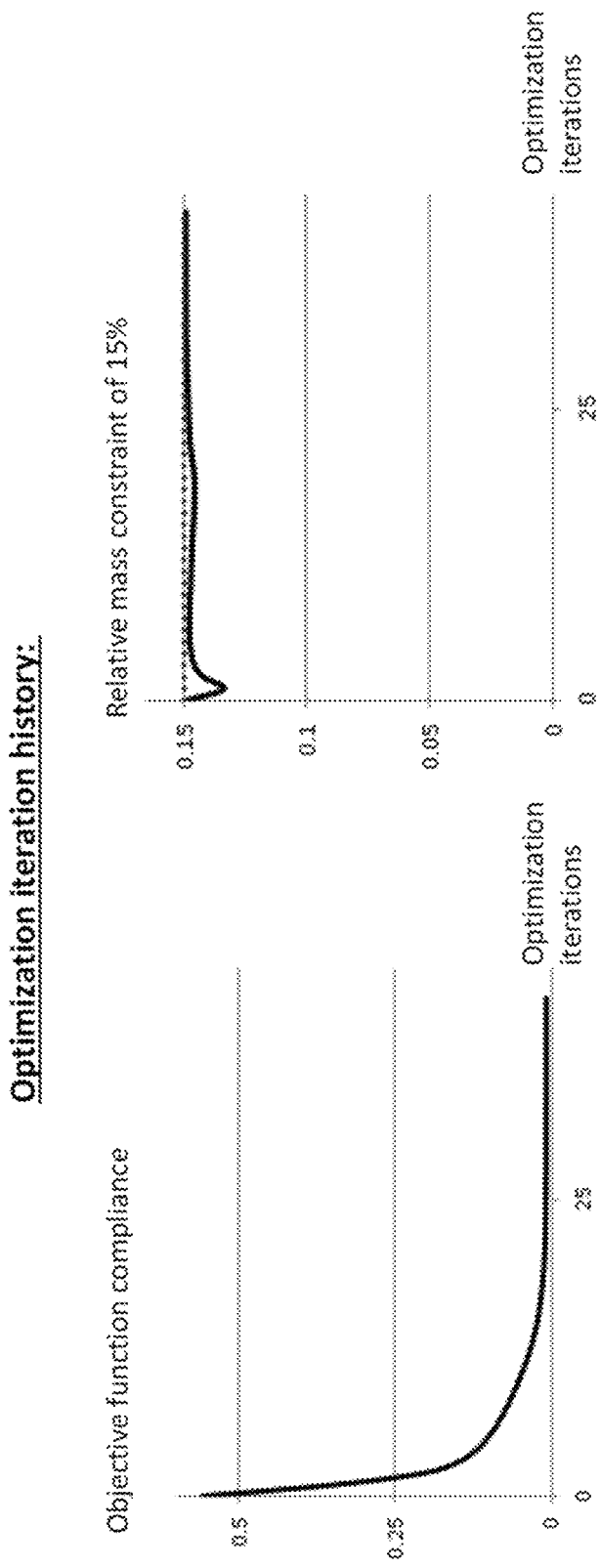

Optimization iteration history:

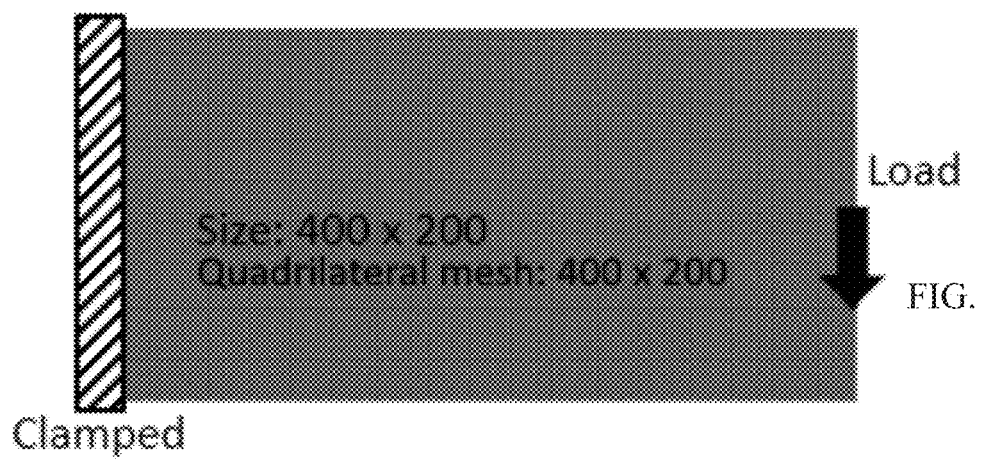
(a) FE-model
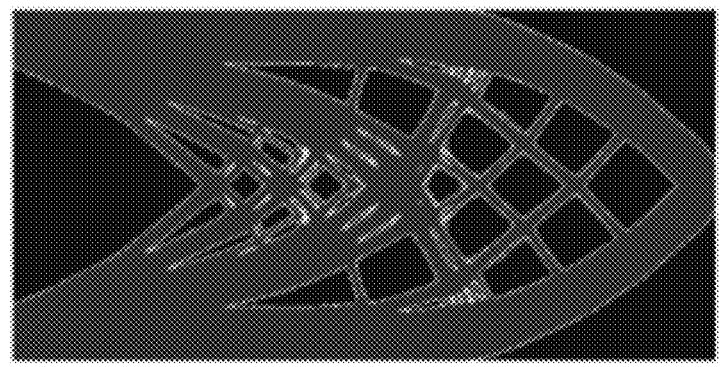
(b) $f \leq 60\%, C = 27.2$
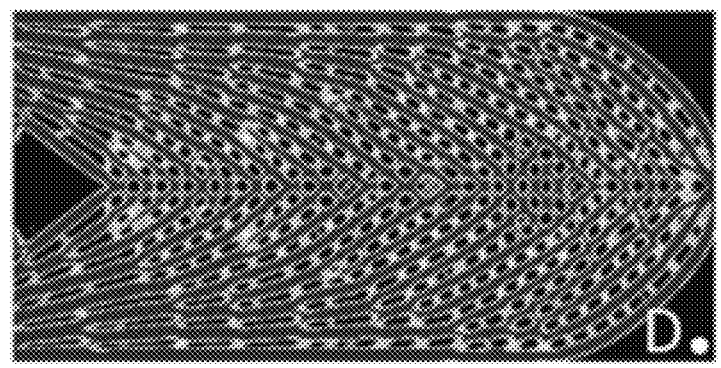
(c) $\bar{s}_{min} \leq 0.6, f \leq 60\%,$
$C = 37.7, D = 12$
FIG. 19A
FIG. 19B
FIG. 19C (a) Objective function: Compliance (b) Constraint: Relative mass of 60%

(c) Constraint: Lowest singular value $s_{min}$ less than 0.60

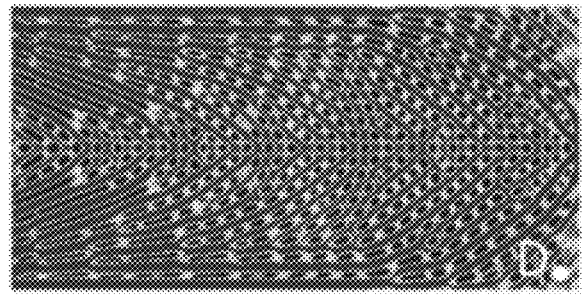
(a) $\bar{s}_{min} \leq 0.60, C = 37.6,$
$f = 62.8\%, D = 12$
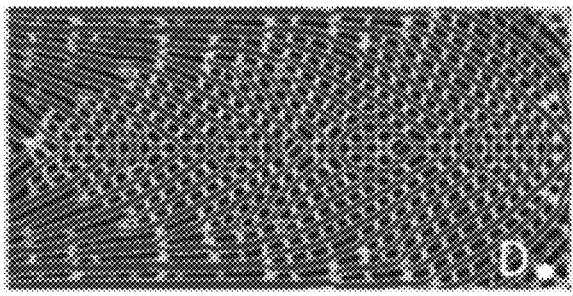
(b) $\bar{s}_{min} \leq 0.50, C = 46.6,$
$f = 53.3\%, D = 12$
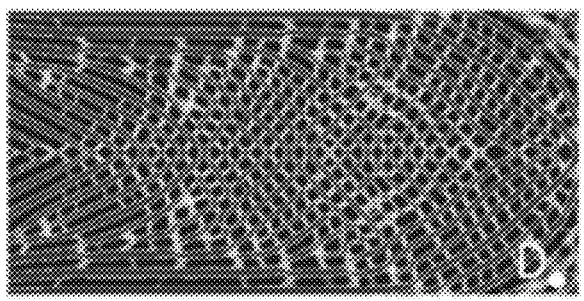
(c) $\bar{s}_{min} \leq 0.40, C = 65.5,$
$f = 43.2\%, D = 12$
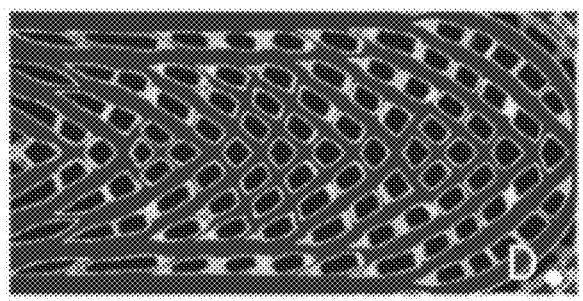
(d) $\bar{s}_{min} \leq 0.60, C = 35.5,$
$f = 61.5\%, D = 24$
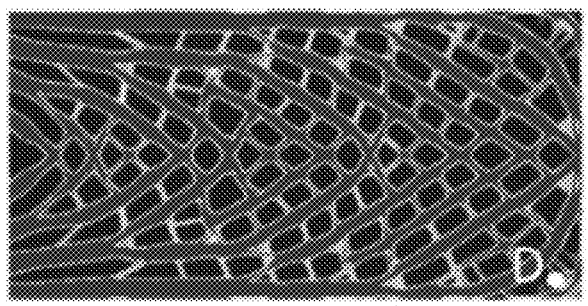
(e) $\bar{s}_{min} \leq 0.50, C = 43.8,$
$f = 50.9\%, D = 24$
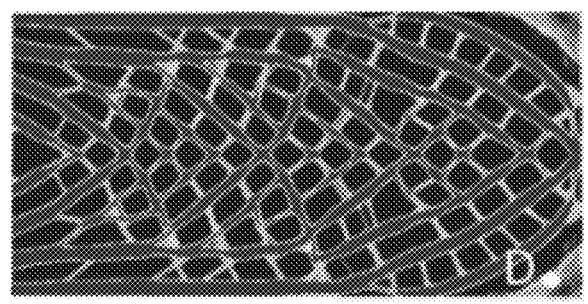
(f) $\bar{s}_{min} \leq 0.40, C = 58.2,$
$f = 40.9\%, D = 24$
FIG. 21

(a) no volume constraint, $f = 62.8, C = 37.6\%$
(b) $f \leq 60\%, C = 37.7$
(c) $f \leq 50\%, C = 39.8$
(d) $f \leq 40\%, C = 46.4$ (a) no volume constraint, $f = 61.5\%, C = 35.5$ (b) $f \leq 60\%, C = 35.6$ (c) $f \leq 50\%, C = 37.1$ (d) $f \leq 40\%, C = 42.5$

GEOMETRICAL DIMENSIONALITY CONTROL IN OPTIMIZATION

CROSS-REFERENCE TO RELATED APPLICATION(S)

This application claims the benefit of priority to U.S. Provisional Patent Application No. 62/945,961 entitled Geometrical Dimensionality Control in Optimization, which was filed on Dec. 10, 2019. The disclosure of the prior application is incorporated by reference herein in its entirety.

FIELD OF THE INVENTION

This disclosure relates to the field of geometrical dimensionality control and, more particularly, relates to systems and methods for geometrical dimensionality control in optimization.

BACKGROUND

A number of computer systems and programs are available that provide a virtual environment for the design of real-world parts or assemblies of parts (e.g., objects). These systems, some of which are referred to as computer-aided design (CAD) systems, enable users to construct, view, and manipulate sometimes complex three-dimensional virtual models of the physical real-world object(s) being designed. The CAD systems typically are configured to provide visual representations of any such modeled objects on a computer-based visual display device using, for example, edges, lines, faces and the like.

Modeled objects are typically represented in a CAD system in CAD files that contain computer-readable specifications of physical, real-world geometries associated with the underlying object or objects. A particular object may be represented by computer-readable code stored in either a single CAD file or multiple CAD files. In one example, a CAD file may contain computer-readable code that represents specifications (e.g., characteristics) associated with a real-world version of a real-world physical object, from which associated geometries of the real-world physical object may be identified (e.g., by the CAD system). From these geometries, the CAD system can generate one or more visual representations of the associated object and display that object on a computer display device. CAD systems include graphic tools for representing the modeled objects to the designers (e.g., on a computer display device); these tools may be configured to display sometimes highly complex objects.

Design optimization is an engineering design methodology using a mathematical formulation of a design problem to support selection of the optimal design among many alternatives. Topology optimization (TO), for example, refers to the technical field associated with optimizes material layout within a given design space, for a given set of loads, boundary conditions, and constraints with the goal of maximizing the performance of the system.

Improvements are needed in the field of design optimization, generally, and topology optimization in particular.

SUMMARY OF THE INVENTION

In one aspect, a computer-implemented method of automatically determining an optimized design for manufacturing a real-world object includes: defining, in memory of a computer-based processor, a finite element model representing a real-world object, the finite element comprising a plurality of elements; evaluating, with the computer-based processor, a distribution of a design variable throughout a vicinity of the finite element model, using singular value decomposition (SVD), to produce a singular value for the design variable in each respective element in the vicinity of the finite element model; defining optimization constraints for the vicinity of the finite element model based on the singular values produced from the SVD; and optimizing the finite element model with respect to the design variable by locally enforcing a geometry of the real-world object in the vicinity based on the defined optimization constraints.

In another aspect, a computer-based system for automatically determining an optimized design for manufacturing a real-world object is disclosed. The computer-based system includes a computer-based processor, and computer-based memory coupled to the computer-based processor. The computer-based memory stores data that defines a finite element model representing a real-world object; the finite element has a plurality of elements. The computer-based memory also stores computer-readable instructions that, when executed by the computer-based processor, cause the computer-based processor to: evaluate a distribution of a design variable throughout a vicinity of the finite element model, using singular value decomposition (SVD), to produce a singular value for the design variable in each respective element in the vicinity of the finite element model; define optimization constraints for the vicinity of the finite element model based on the singular values produced from the SVD; and optimize the finite element model with respect to the design variable by locally enforcing a geometry of the real-world object in the vicinity based on the defined optimization constraints.

In yet another aspect, a non-transitory computer readable medium having stored thereon computer-readable instructions that, when executed by a computer-based processor, causes the computer-based processor to: evaluate a distribution of a design variable throughout a vicinity of the finite element model, using singular value decomposition (SVD), to produce a singular value for the design variable in each respective element in the vicinity of the finite element model; define optimization constraints for the vicinity of the finite element model based on the singular values produced from the SVD; and optimize the finite element model with respect to the design variable by locally enforcing a geometry of the real-world object in the vicinity based on the defined optimization constraints.

Yet another aspect is directed to a computer-based process that includes identifying non-parametric design variables in a finite element model, evaluating a distribution of the design variables around a given finite element design variable using SVD, obtaining singular values for each design variable, calculating optimization design response(s) from the singular values for each design variable element, aggregating each type of optimization design response for the design variable elements into a single constrained design response value for an entire design variable group, and implementing aggregated design response values as constraints in a structural optimization solution.

In some implementations, one or more of the following advantages are present.

For example, various implementations provide highly effective and optimized designs in a highly efficient manner. Moreover, the approach can be implemented in addition to imposing other design requirements, e.g. stiffness and strength. Additionally, the approach provides one implementation for potentially multiple tasks (enforce 2D, enforce 1D, limit local material amount, control of the curvatures, thin/thick control, control proportions, control orientations). The approach is generally applicable to any finite element mesh (structured/unstructured, any type of elements, 1D-3D, etc.) The approach enjoys intuitive set up and the interpretation and relation of all applied measures is relatively straight-forward.

Moreover, many manufacturing processes in 3D printing (also called additive manufacturing) do not allow powder to be trapped during the printing process. Accordingly, hollow and enclosed structural parts are not allowed as parts of a feasible manufacturable design solution. In some implementations, hollow and enclosed structural parts can be eliminated from an optimized design by enforcing a structural layout of the parts to be lattices through the geometrical dimensionality control constraining the certain singular values (e.g., $s_{min}$ and $s_{mid}$) to be very small (e.g., close to zero).

Additionally, many metallic parts for automotive structures are sheet-manufactured structures as these have very price competitive manufacturing processes. However, frequently designs optimized using TO have bulky material layouts more suitable for casting. Therefore, a sheet-manufactured optimized design can be achieved enforcing a layout of the part to locally have a membrane layout through the geometrical dimensionality control constraining the certain singular values (e.g., relation between $s_{max}$ and $s_{mid}$) to be high (e.g., close to one).

Other features and advantages will be apparent from the description and drawings, and from the claims.

BRIEF DESCRIPTION OF THE DRAWINGS

FIG. 4A shows a structural element in the form of a sphere having a given radius.

FIG. 4B shows a relative density field in the structural element of FIG. 4A.

FIG. 4C shows elemental centroids of the relative density field of FIG. 4B.

FIG. 4D shows coordinates of the elemental centroids in FIG. 4C scaled by relative densities.

FIG. 4E shows Singular Value Decomposition (SVD) values ($s_{max}$, $s_{mid}$, $s_{min}$) related to the three dimensions of the object and the corresponding orientations/vectors of the points cloud in FIG. 4D.

FIG. 10 shows normalized singular values all being 1 for a relative density field as design variables for example for topology optimization representing assemblies of 1D or 0D parts in a 3D space.

FIGS. 13A and 13B show an optimization iteration history for objective function compliance minimizing the compliance subject to a relative mass constraint of 15%.

FIG. 19A shows a rectangular 2D design domain discretized by a 400×200 uniform grid.

FIG. 19B shows classic stiffness topology optimization using a material volume fraction f=60%.

FIG. 19C shows, the classic topology optimization in 19B, but including an additional constraint for the proposed approach defined in equation (17) constraining the lowest singular value to be less or equal to 0.6 using a diameter D=12 equivalent to 12 finite elements.

FIG. 21 shows exemplary optimization results.

Like reference characters refer to like elements.

DETAILED DESCRIPTION

Figure 1:
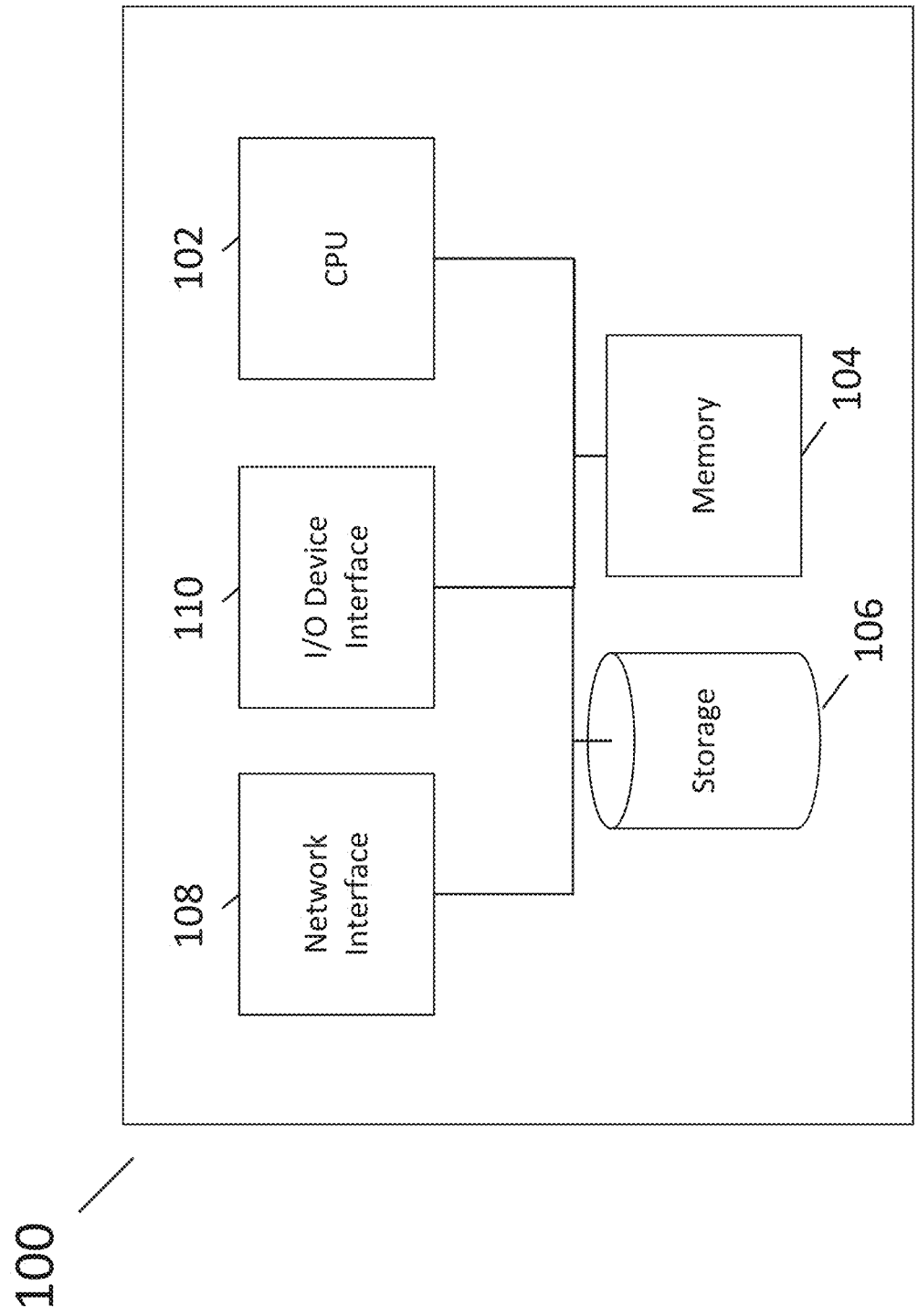
FIG. 1 is a simplified block diagram of a computer system for performing an embodiment of the design processes disclosed herein.

Design optimization refers generally to engineering design methodologies that involve mathematical formulations of design problems to support selection of an optimal design among many alternatives.

Optimization methodologies generally include selection of a best element or elements (with respect to some criterion) from some set of available alternatives. Optimization problems arise in a variety of disciplines even beyond product design optimization. In a simple case, optimization problems involve maximizing or minimizing a real function by systematically choosing input values for the real function from within an allowed set and computing the value of the function.

Design optimization generally involves design variables (that can be used to describe various design alternatives), design objectives (a combination of specific design variable values to be maximized or minimized), constraints (conditions, e.g., variables or combinations of variables expressed by equalities, inequalities, etc., that must be satisfied in order for a particular design alternative to be acceptable), and feasibility (represented by a set of values for the design variables that satisfies all constraints and/or design objectives).

One example of a design optimization problem, represented in mathematical form, is:

minimize $f(x)$
subject to $h_i(x)=0, i=1, \ldots, m_1$
$g_j(x) \leq 0, j=1, \ldots, m_2$
and $x \in X \subseteq \mathbb{R}^n$ where x is a vector of n real-valued design variables, $f(x)$ is referred to as an objective function, $h_i(x)$ and $m_1$ are equality constraints, $g_i(x)$ and $m_2$ are inequality constraints, X is a set of constraints that includes additional restrictions on x beyond those implied by the equality and inequality constraints.

One particular type of optimization is topology optimization, which generally includes mathematical methods that optimize material layout, for example, within a given design space, for a given set of loads, boundary conditions, and/or constraints with the goal of maximizing the performance of the system. Topology optimization is different from shape optimization and sizing optimization in that, in topology optimization, the design can attain any shape within the design space, instead of dealing with predefined configurations.

A topology optimization formulation typically uses a finite element method to evaluate design performance. The design may be optimized using either gradient-based mathematical programming techniques, such as the optimality criteria algorithm and the method of moving asymptotes or non-gradient-based algorithms, such as generic algorithms.

Topology Optimization has a wide range of applications in various engineering and design disciplines, such as aerospace, mechanical, biochemical, and civil engineering. Topology optimization may be used at the concept level of a design process. Due to the free forms that naturally occur in topology optimization, the result is sometimes difficult to manufacture. In certain implementations, the techniques disclosed herein may help overcome limitations of prior techniques.

Prior Optimization Techniques

Some prior optimization techniques, discussed below in turn, include filter techniques (also sometimes called regularization techniques) and projection methods of the design variables, direct parameterization of design variables, penalty functions or projection functions on design variables, local volume constraints, and heuristic methods. The techniques disclosed in present application differ from those prior techniques. For example, the techniques disclosed in the present application involve utilizing singular value decomposition (SVD) of design variables to optimize certain aspects of a design (e.g., topology). In some implementations, the resulting singular values may be applied in an objective function for the optimization process as a term to be optimized. Alternatively, in some implementations, the resulting singular values may be utilized as an optimization constraint in order to locally restrict geometry of the optimized structure. None of the prior optimization techniques discussed below utilizes singular value decomposition (SVD) of design variables in similar manner.

1. Filter Techniques (Also Sometimes Called Regularization Techniques) and Projection Methods of Design Variables.

A common approach is density variable filtering for topology optimization where relative densities are the design variables and are filtered. (See, e.g., M. P. Bendsøe and O. Sigmund, Topology Optimization—Theory, Methods, and Applications, 2004; O. Sigmund and J. Petersson, Numerical instabilities in topology optimization: A survey on procedures dealing with checkerboards, mesh-dependencies and local minima, Structural Optimization 16 (1998) 68-75; B. S. Lazarov, F. Wang and O. Sigmund, Length scale and manufacturability in density-based topology optimization, Archive of Applied Mechanics 86(1-2) (2016) 189-218; M. Zhou, B. S. Lazarov, F. Wang and O. Sigmund, Minimum length scale in topology optimization by geometric constraints, Computer Methods in Applied Mechanics and Engineering 293 (2015), 266-282; B. S. Lazarov and F. Wang, Maximum length scale in density based topology optimization, Journal Computer Methods in Applied Mechanics and Engineering, 318 (2017) 826-844, and other references mentioned therein). These filter techniques and projection methods can be combined for enforcing a length scale thereby helping to ensure a manufacturable structure for member size requirements for example for casted manufactured structures, 3D printed structures, milled structures, etc.

The techniques disclosed in the present application can enforce geometrical length scales through a diameter. However, the techniques disclosed in the present application are fundamentally different than filter techniques and projection of design variables methods. For example, as mentioned above, the techniques disclosed in the present application involve utilizing singular value decomposition (SVD) of design variables in particular ways to optimize certain aspects of a design (e.g., topology); filter techniques and projection of design variables methods do not utilize singular value decomposition (SVD) of design variables.

2. Direct Parametrization of Design Variables

Direct parametrization of design variables can be used, for example, to obtain feasible designs for casted structures and plate manufactured structures. (See, e.g., S. Zhang, J. A. Norato, A. L. Gain, et al., A geometry projection method for the topology optimization of plate structures, Structural and Multidisciplinary Optimization 54(5) (2016) 1173-1190; J. P. Leiva, B. C. Watson† and I. Kosaka, An Analytical Bi-Directional Growth Parameterization to Obtain Optimal Castable Topology Designs, 10th AIAA/ISSMO Multidisciplinary Analysis and Optimization Conference, 30 Aug.-1 Sep. 2004, Albany, New York; and A. Roulund-Gersborg and C. Andreasen, An explicit parameterization for casting constraints in gradient driven topology optimization, Structural and Multidisciplinary Optimization 44(6) (2010) 875-881.).

The techniques disclosed in the present application can be applied to obtaining feasible designs for plate manufactured structures too. However, the techniques disclosed in the present application are different than direct parameterization of design variables. For example, the techniques disclosed herein do not include applying a new parametrization or mapping of design variables. Moreover, as mentioned above, the techniques disclosed in the present application involve utilizing singular value decomposition (SVD) of design variables in particular ways to optimize certain aspects of a design (e.g., topology); direct parameterization of design variables does not utilize singular value decomposition (SVD) of design variables.

3. Penalty Functions or Projection Functions on Design Variables

Penalty functions can be applied to ensure geometrically feasible designs for additive manufacturing (3D printing) and multi-axis machining. (See, e.g., M. Langelaar, An additive manufacturing filter for topology optimization of print-ready designs, Structural and Multidisciplinary Optimization 55(3) (2017) 871-883; M. Langelaar, Topology optimization for multi-axis machining, Computer Methods in Applied Mechanics and Engineering, Structural and Multidisciplinary Optimization 351 (2019) 226-252; M. Hoffarth, N. Gerzen, C. B. W. Pedersen, ALM Overhang Constraint in Topology Optimization for Industrial Applications, 12th World Congress on Structural and Multidisciplinary Optimization 5-9 Jun. 2017, Braunschweig, Germany; and US Patent Application Publication No. 2017/0176975 A1, entitled "Penalty Function On Design Variables For Designing Variables For Designing Cost Beneficially Additive Manufacturable Structures."

Projection schemes have some ability to apply geometrical control for optimization, so the designs are geometrically feasible for manufacturing. (See, e.g., S. L. Vatanabe, T. N. Lippi, C. R. Lima, G. H. Paulino and E. C. N. Silva, Topology optimization with manufacturing constraints: A unified projection-based approach, Advances in Engineering Software 100 (2016) 97-112, and J. V. Carstensen and J. K. Guest, Projection-based two-phase minimum and maximum length scale control in topology optimization, Structural and Multidisciplinary Optimization, 58(5) (2018) 1845-1860.) Certain works employ the geometry projection method to project an analytical description of a set of geometric primitives and fixed-thickness plates, respectively. These may force the structural members to be super shapes or plates for manufacturability. (See, e.g., J. A. Norato, Topology optimization with supershapes, Structural and Multidisciplinary Optimization 58(3) (2018) 1-20; and S. Zhang, J. A. Norato, A. L. Gain and N. Lyu, A geometry projection method for the topology optimization of plate structures, Structural and Multidisciplinary Optimization 54(5) (2016), 1173-1190.)

The techniques disclosed in the present application can enforce plate-like structures but are fundamentally different from penalty functions or projection functions. For example, as mentioned above, the techniques disclosed in the present application involve utilizing singular value decomposition (SVD) of design variables in particular ways to optimize certain aspects of a design (e.g., topology); penalty functions or projection functions do not utilize singular value decomposition (SVD) of design variables.

4. Local Volume Constraints

Several works apply local volume constraint approaches enforcing geometrically porous like structures and the local volume constraint can also be applied to mimic lattice like structures. (See, e.g., Wu, N. Aage, R. Westermann, O. Sigmund, Infill optimization for additive manufacturing Approaching bone-like porous structures, IEEE Transactions on Visualization and Computer Graphics 24 (2) (2018) 1127-1140; Wu, A. Clausen, O. Sigmund, Minimum compliance topology optimization of shell-infill composites for additive manufacturing, Computer Methods in Applied Mechanics and Engineering 326 (2017) 358-375; and M. Schmidt, C. B. W. Pedersen, C. Gout, On structural topology optimization using graded porosity control, Structural and Multidisciplinary Optimization 60(4) (2019) 1437-1453.).

The techniques disclosed in the present application can enforce lattice-like structures but are fundamentally different than local volume constraint approaches. For example, as mentioned above, the techniques disclosed in the present application involve utilizing singular value decomposition (SVD) of design variables in particular ways to optimize certain aspects of a design (e.g., topology); local volume constraints approaches do not utilize singular value decomposition (SVD) of design variables.

5. Heuristic Methods

Several works relate to heuristic methods.

For example, the work in N. Strömberg, Topology optimization of structures with manufacturing and unilateral contact constraints by minimizing an adjustable compliance—volume product, Structural and Multidisciplinary Optimization 42(3) (2010) 341-350 applies a heuristic method updating the move limits in each optimization iteration defined such that the draw constraints are satisfied. Thereby, no explicit constraint appears in the nested formulation except for the lower and upper limits on the densities but these move limits updates are fully heuristic.

The work in R. Dienemann, A. Schumacher and S. Fiebig, Topology optimization for finding shell structures manufactured by deep drawing, Structural and Multidisciplinary Optimization 56(2) (2017) 473-485 applies a mid-surface approach by calculating the average of the element coordinates in the punch direction for achieving deep drawing manufactured structures. The implementation of this approach is more heuristic, as the movement of the mid surface at a constant wall thickness is not consistently included in the mathematical sensitivity calculation. This is seen by the increased number of optimization iterations.

These heuristic methods \ are partially mathematically inconsistent being heuristic whereas the techniques disclosed in the present application are mathematically consistent and the techniques disclosed in the present application can also enforce structures suitable for deep drawing. However, the techniques disclosed in the present application are fundamentally different than heuristic methods. For example, For example, as mentioned above, the techniques disclosed in the present application involve utilizing singular value decomposition (SVD) of design variables in particular ways to optimize certain aspects of a design (e.g., topology); heuristic methods do not utilize singular value decomposition (SVD) of design variables.

The novel techniques disclosed herein, which generally involve utilizing singular value decomposition (SVD) of design variables in particular ways to optimize certain aspects of a design (e.g., topology), are different than the prior approaches disclosed above. These differences are not trivial. For example, in some implementations, the novel techniques disclosed herein yield optimized designs that are less bulky than prior approaches might yield and that are more feasible to manufacture (e.g., using a single stamped metal sheet or a structure of several stamped metal sheets welded together).

Case in point: automotive companies (e.g., General Motors®, Volkswagen®, AUDI®, BMW®, Ford®, Jaguar Land Rover™) and aerospace companies (e.g. Airbus®, Boeing®), in particular, intensively use optimization processes for structural parts. These optimization processes often yield structures with subcomponents having bulky designs. Frequently, a practical and industrial design requirement from a manufacturing process perspective is that the structure should be manufactured using a single stamped metal sheet or a structure welded together of several stamped metal sheets.

Figures 12D, 12E:
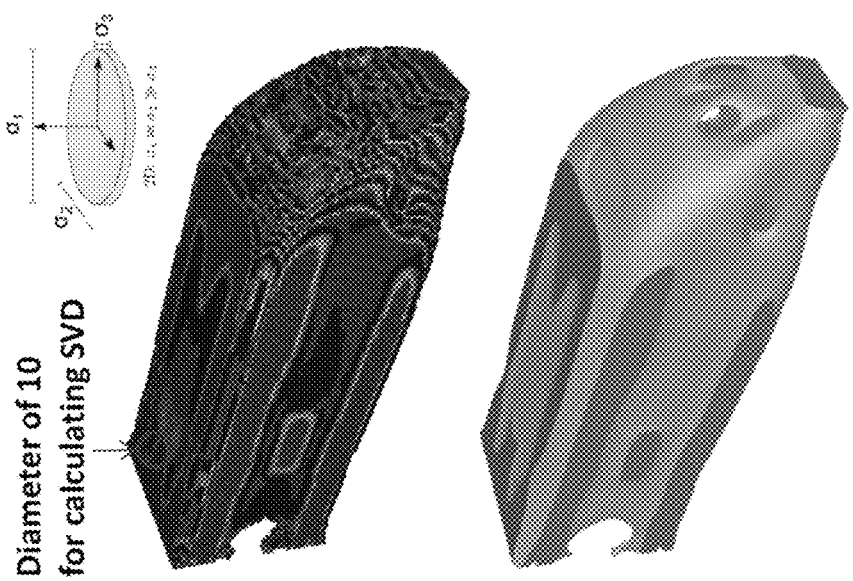
FIG. 12D shows a topology optimization result with dimensionality control enforcing 2D subcomponents being structural plates by constraining the lowest singular value $\sigma_3$ to be less than 0.15 of the decomposition (SVD) of the design variables (DV) in a diameter of 10.0
FIG. 12E shows a smoothed topology optimization result based on the FIG. 12D design.
Figures 12B, 12C:
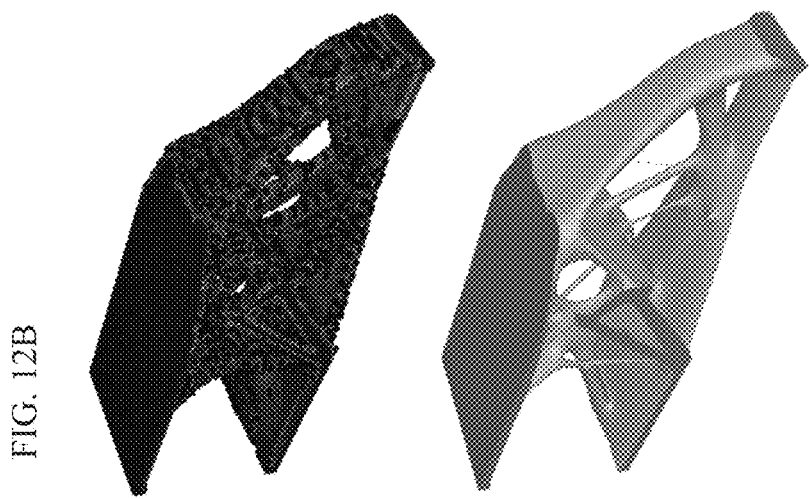
FIG. 12B shows a topology optimization result based on the FIG. 12A design space without geometrical dimensionality control.
FIG. 12C shows a smoothed topology optimization result based on the FIG. 12B design.
Figure 12A:
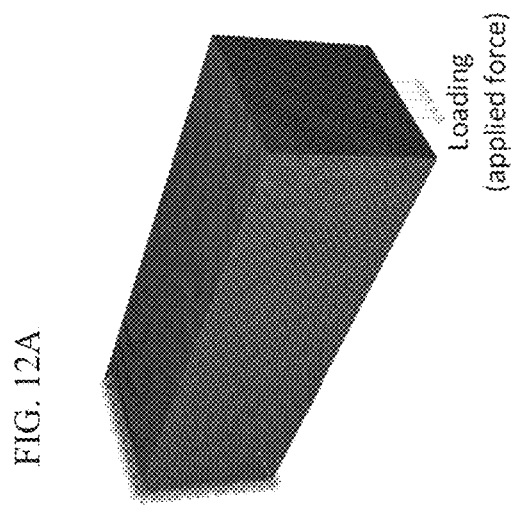
FIG. 12A shows design space for topology optimization subdivided into finite elements where the relative density of each element is a design variable; the beam is fully clamped at the left hand side and the bottom edge of the right hand subject to a load.

In some implementations, the techniques disclosed in present application can produce and advantageously enforce designs to be feasible for manufacturing, for example, with respect to stamped plate structures. (See, e.g., FIG. 12). The model for topology optimization in FIG. 12 is a beam fully clamped at the left-hand side and the bottom edge of the right-hand hand side is subject to a load. The model shown in FIG. 12A may consist of 375,000 linear eight-node continuum finite elements each having a size of 1×1×1 with the total beam size being 50×50×150. Each finite element in the illustrated example is a design variable that may be defined using the SIMP approach (Solid Isotropic Material with Penalization) and the topology optimization may be executed using topology sensitivities and mathematical programming (see, e.g., M. P. Bendsøe and O. Sigmund, Topology Optimization—Theory, Methods, and Applications, 2004.)

The finite element model is linear with a linear constitutive material having a Poisson Ratio of 0.30 and Young's Modulus of 210000 is applied. The objective of the optimization in this example is to maximize the stiffness by minimizing the compliance for given fixed relative mass of 15% of the design domain in FIG. 12A. FIG. 12B shows an exemplary topology optimization result without geometrical dimensionality control. FIG. 12C shows an example of a resulting real-world object based on the FIG. 12B design. FIG. 12D shows an exemplary topology optimization result with dimensionality control enforcing 2D subcomponents being structural plates by constraining the lowest singular value $s_{min}$ to be less than 0.15. This enhances manufacturability of the optimized design particularly using structural plates. The value $s_{min}$ in this example is calculated performing the decomposition (SVD) of the design variables (DV) in a diameter of 10 (see FIG. 12D) in the vicinity of each respective finite element. FIG. 12E shows an example of a resulting real-world object based on the FIG. 12D design.

As indicated, the traditional topology optimization result without geometrical dimensionality control consist of subcomponents being strictly bars and beams whereas the present topology optimization result with dimensionality control enforces 2D mainly consists of subcomponents being structural plates. Consequently, the two different designs having normally very different processes applied for manufacturing. Notably, both designs in FIG. 12B and FIG. 12D have a relative mass of 15% of the design domain in FIG. 12A. However, the design of FIG. 12B without geometrical dimensionality control has a lower compliance of 0.00750 whereas the design of FIG. 12D with geometrical dimensionality control has a higher compliance of 0.00896. Consequently, enforcing geometrical dimensionality control as here for example shown for 2D subcomponents ensuring feasibility for the manufacturing with respect to stamped plate structures has an impact on the objective function value and for the present example; the decrease in stiffness is 16% for the same mass.

FIGS. 13A and 13B show the optimization iteration history of the design in FIG. 12B obtained using the traditional topology optimization workflow without geometrical dimensionality control. More specifically, FIG. 13A shows how objective function compliance changes with respect to the number of optimization iterations, and FIG. 13B shows how the relative mass constraint of 15% changes with respect to optimization iterations.

Figure 14A:
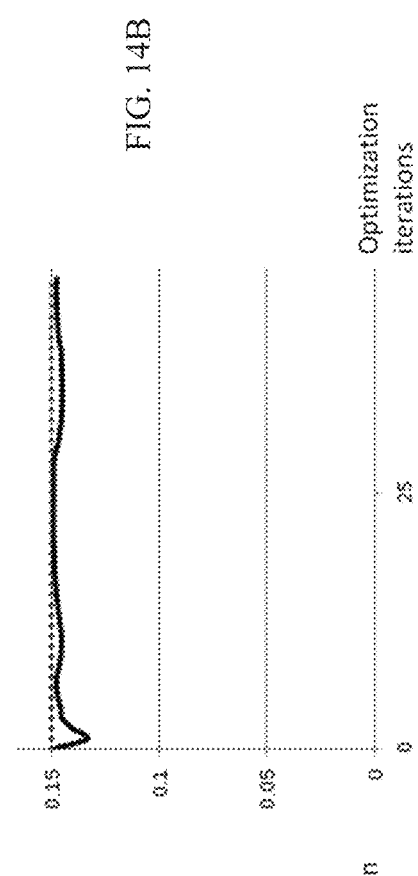
FIG. 14A-14C show an optimization iteration converge history for minimizing the compliance subject to a relative mass constraint of 15% and to an approach of constraining the lowest singular value $\sigma_3$ to be less than 0.15 of the singular value decomposition (SVD) of the design variables (DV) in a diameter of 10.0.
Figure 14B:
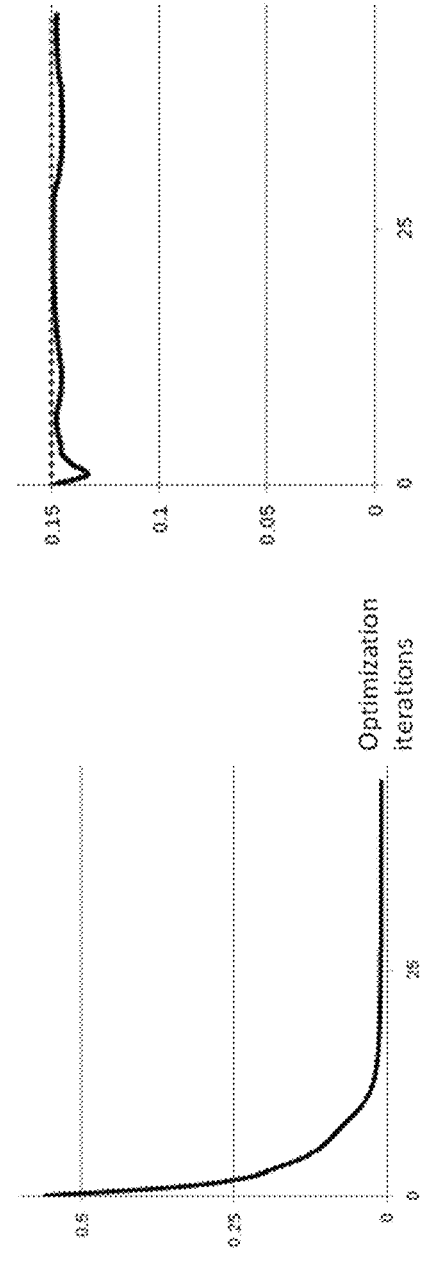
Figure 14C:
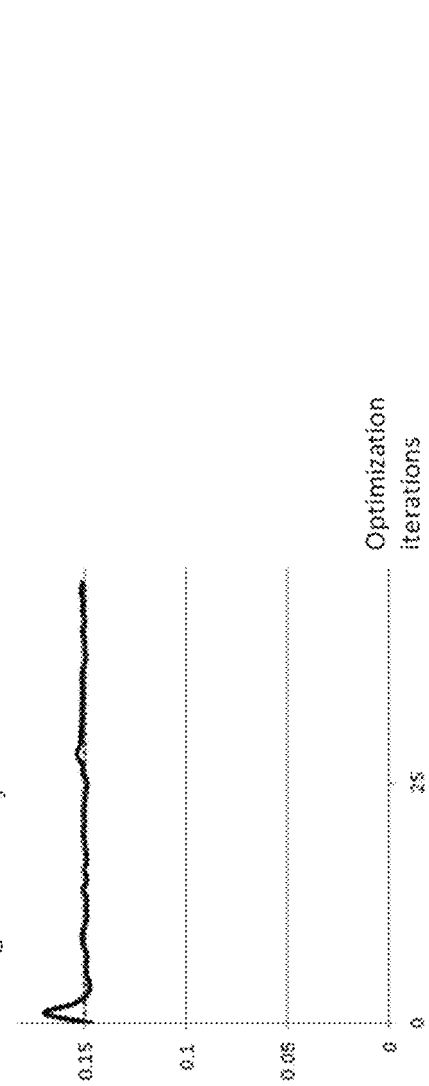

FIGS. 14A-14C show the optimization iteration history of the design in FIG. 12D obtained using a topology optimization workflow with geometrical dimensionality control. More specifically, FIG. 14A shows how objective function compliance changes with respect to the number of optimization iterations, FIG. 14B shows how the relative mass constraint of 15% changes with respect to optimization iterations, and FIG. 14C shows how the lowest singular value (to be less than 0.15) changes with respect to optimization iterations.

Comparing the optimization histories in FIG. 13A/B and FIG. 14A/B/C, one can observe that additionally constraining the lowest singular value $s_{min}$ to be less than 0.15 does not significantly change the optimization history. Secondly, the approach of geometrical dimensionality control in optimization constraining the singular values of the decomposition (SVD) of the design variables can be used in optimization workflows based upon sensitivities and mathematical programming and does not lead to optimization convergence issues.

FIG. 1 is a schematic representation of an exemplary computer-based system 100 that may be used to produce an optimized design for a physical, real-world object according to one or more techniques disclosed herein including, for example, techniques that utilize singular value decomposition (SVD) of design variables to optimize certain aspects of a design (e.g., topology).

The computer-based system 100 has a central processing unit 102, computer-based memory 104, computer-based storage 106, a network interface 108, an input/output device interface 110, and a bus that serves as an interconnect between those components. In a typical implementation, the bus provides a communications medium over which the various components of the computer-based system 100 can communicate and interact with one another.

The central processing unit (CPU) 102 is configured to perform various computer-based functionalities, including those disclosed herein. Typically, the CPU performs these functions by executing computer-readable instructions from a non-transient computer-readable medium, such as computer-based memory 104 and/or computer-based storage 106, and/or from computer-readable data received from an external source via the I/O device interface 110 and/or the network interface 108, for example.

The computer-based memory 104 provides a form of volatile storage for computer-readable instructions that, when executed by the CPU 102, cause the CPU to perform various computer-based functionalities including, for example, those disclosed herein.

Computer-based storage 106 provides a form of non-volatile storage for software instructions, such as an operating system (not shown), and embodiment configurations, etc.

The network interface 108 is for connecting to any variety of computer-based or communications networks, including, for example, local area networks (LANs), and/or wide area networks (WANs) such as the Internet.

The input/output device interface 110 is configured to act as a connection interface for one or more input and/or output devices such as a keyboard, mouse, display, speakers, etc. In a typical implementation, the computer system 100 may configured so as to display (e.g., on a display device connected to the I/O device interface 110) a visual representation of an optimized design, optimized in accordance with the techniques disclosed herein. In some implementations, the design may appear as shown, for example, in FIG. 12D or 12E, 16C or 16D, or 17A or 17B. Moreover, the display in such implementations, may enable a user to view other information (e.g., performance characteristics, manufacturing information, etc.) about a displayed, optimized design.

In various implementations, the computer system 100 may have additional elements, such as controllers, buffers (caches), drivers, repeaters, and receivers, to facilitate communication and other computer-based functionalities. Further, the interfaces may include address, control, and/or data connections to facilitate communication among the illustrated components.

Figure 2:
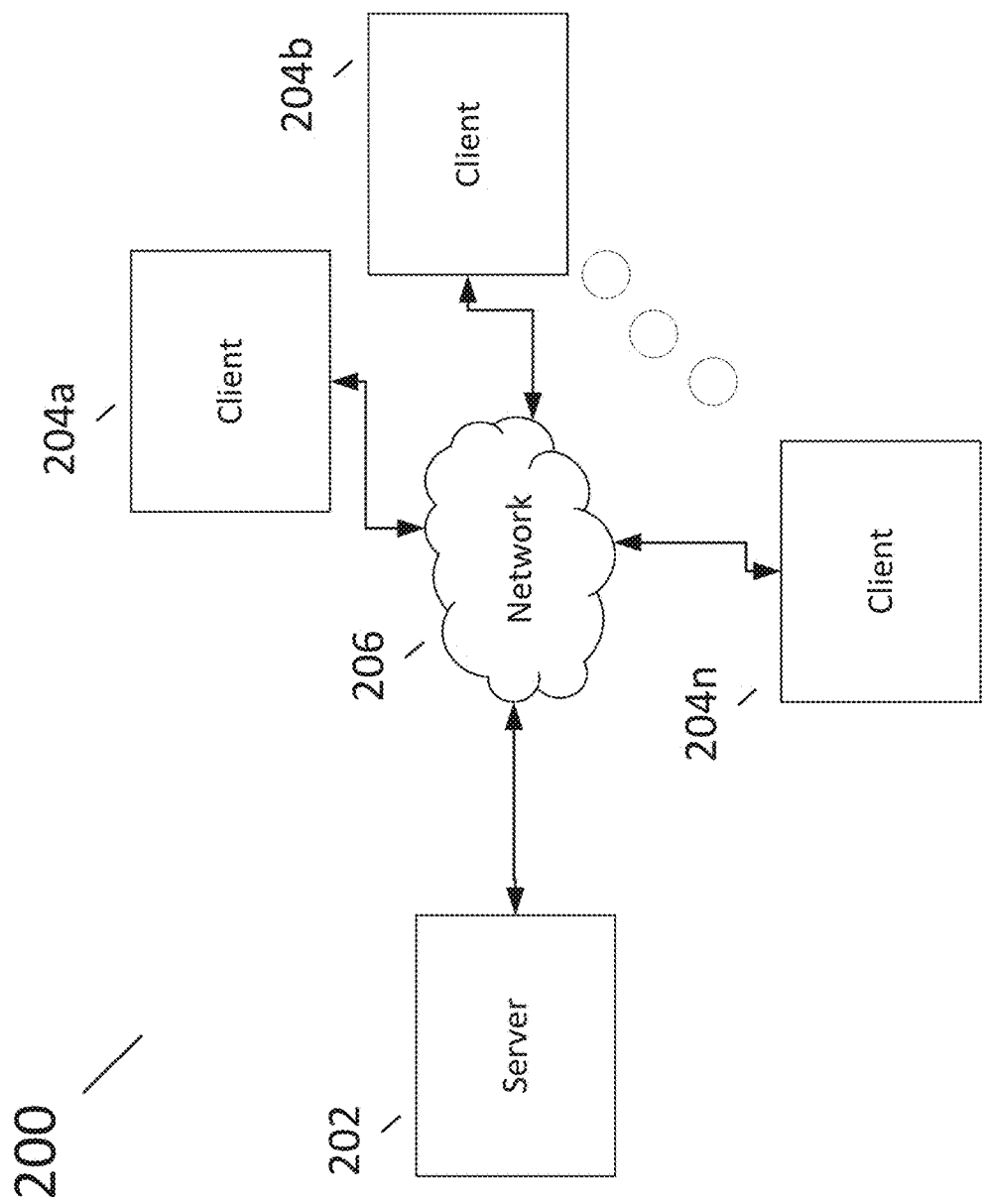
FIG. 2 is a simplified block diagram of a computer network environment in which an embodiment of the design processes disclosed herein.

FIG. 2 is a schematic representation of an exemplary computer network environment 200 that may be used to determine an optimized design for a physical, real-world object according to one or more techniques disclosed herein including, for example, those that utilize singular value decomposition (SVD) of design variables to optimize certain aspects of a design (e.g., topology).

The computer network environment 200 has a server 202, and clients 204a, 204b, . . . 204n coupled to one another via a communications network 206 that enables the server 202 and clients 204a to communicate and interact with one another. In a typical implementation, every client 204a, 204b, . . . 204n and the server may include the same types of components that are in the computer system 100 of FIG. 1. In some implementations, each client 204a, 204b, . . . 204n may be configured to perform the functionalities disclosed herein to optimize a design without requiring involvement of the server 202. In some implementations, the functionalities disclosed herein to optimize a design may be distributed between the server 202 and a client (e.g., 204b), with the server 202 providing, for example, cloud computing functionalities in the context of software as a service (SAAS).

Figure 3A:
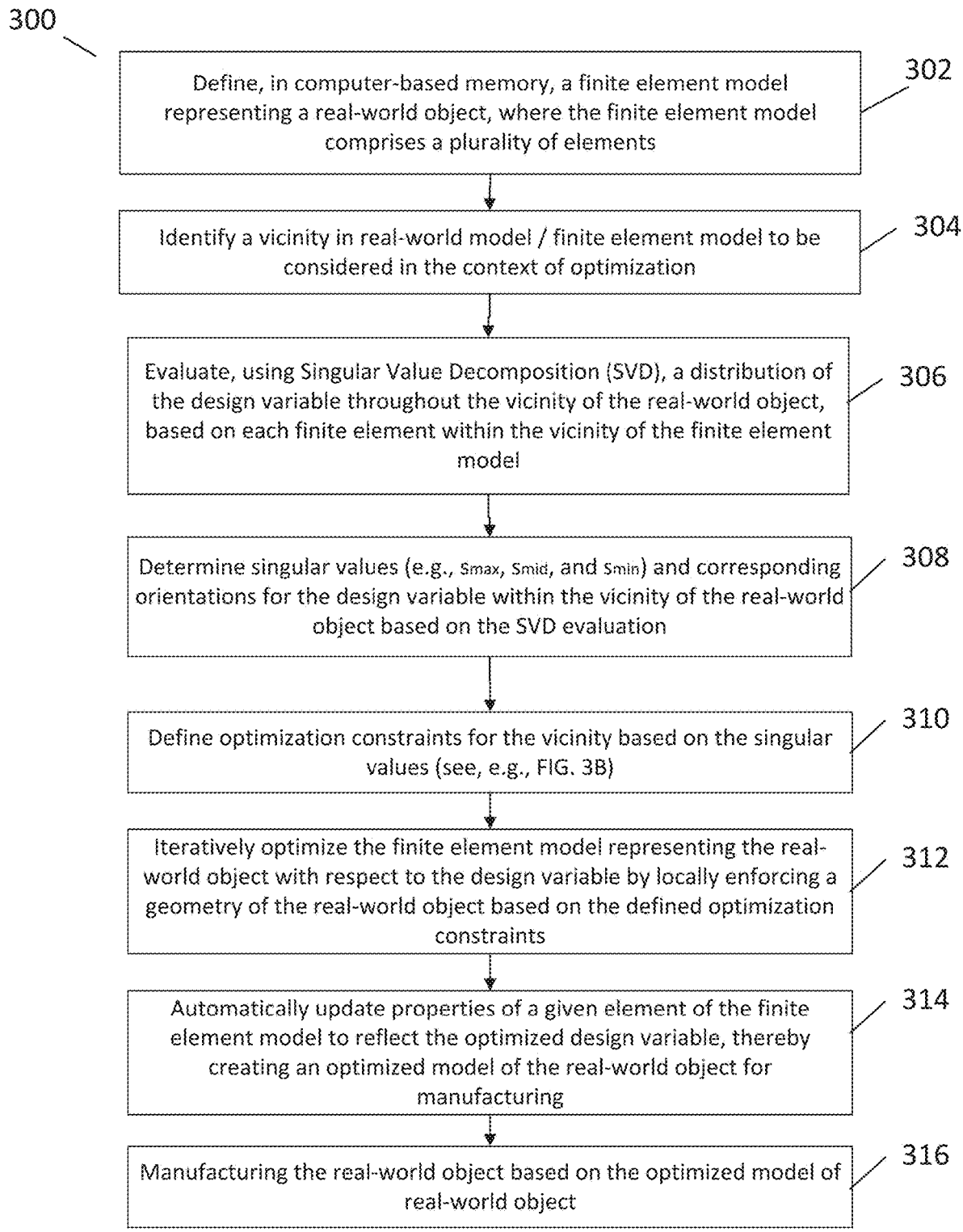
FIGS. 3A and 3B represent a flowchart that shows an exemplary implementation of a design optimization process that involves constraining design values based on singular value decomposition (SVD) of design variables.
Figure 3B:
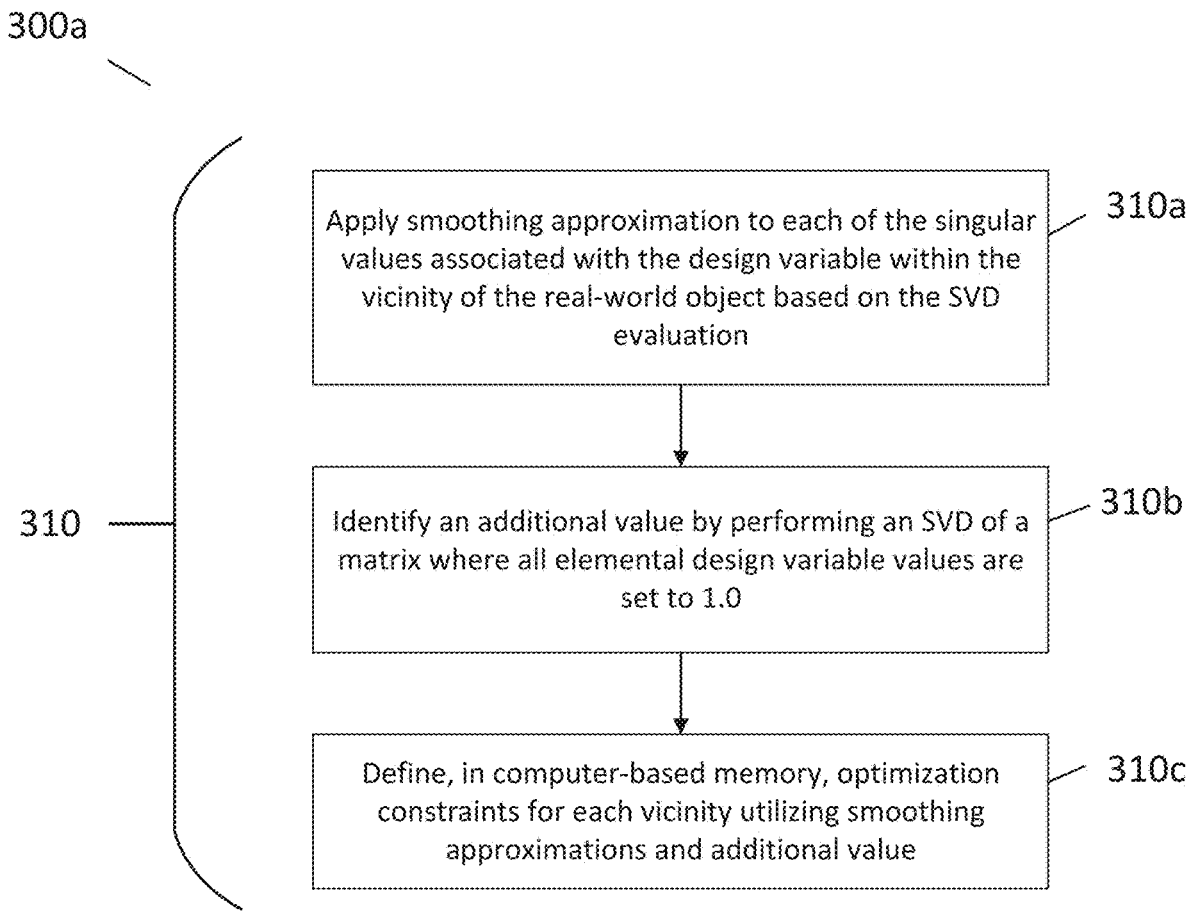

FIGS. 3A and 3B, collectively, show a flowchart that represents an exemplary implementation of a method 300 of automatically determining an optimized design for a real-world object; the method includes constraining values from a singular value decomposition (SVD) of design variables.

The illustrated method 300 begins by defining 302, in memory of a computer-based processor, a finite element model based on a CAD model of a real-world physical object whose design is to be optimized.

CAD systems and computer-aided engineering (CAE) systems, for example, provide a wide range of possibilities for how to represent a real-world physical object in a virtual, computer-based environment. Representing a real-world physical object as a finite element model is one such possibility. The phrase finite element model (FEM) refers to the type of model associated with and utilized in finite element analysis and in connection with the finite element method.

Finite element analysis refers to the practical application of a finite element method, which is a method of solving engineering or design problems that involves subdividing a system (or object or CAD model of an object) into smaller, simpler parts that are referred to as finite elements. This subdividing may be achieved by a particular space discretization in the space dimensions, which is implemented by constructing a mesh of the object at issue (a continuous domain) into a set of discrete sub-domains, usually called elements. In some implementations, the finite element method may involve formulation of a boundary value problem that results in a system of algebraic equations. The finite element method approximates the unknown function over the domain. The simple equations that model these finite elements are then assembled into a larger system of equations that models the entire problem. The finite element method may then utilize variational methods from the calculus of variations to approximate a solution (e.g., by minimizing an associated error function or the like).

There are a variety of software applications for performing or facilitating finite element analysis and to generate a finite element model. One such software application is Abaqus FEA™, a software suite available from Dassault Systèmes Simulia Corp., which includes computer-readable instructions that, when executed by a processor within a computer system such as the one represented in FIG. 1, performs computer-based finite element analysis functionalities, In a typical implementation, Abaqus FEA™ software may be incorporated into or provided as a part of a version of a SIMULIA® Tosca Structure, also available from Dassault Systèmes Simulia Corp., adapted to support the various optimization-related functionalities disclosed herein. In a typical implementation, any such computer-readable instructions (e.g., Abaqus FEA™ software incorporated into or provided as a part of an adapted version of the SIMULIA® Tosca Structure) may be stored on a non-transient computer-readable medium (e.g., in computer-based memory 104 or computer-based storage 106 of FIG. 1) and be executable by a computer-based processor (e.g., a central processing unit 102 in FIG. 1) coupled to the non-transient computer-readable medium.

In a typical implementation, the finite element model comprises a system of points called nodes which are interconnected to make a grid, referred to as the mesh. In a typical implementation, the finite element model is represented by a collection of data that defines the finite element model stored in computer-readable form in a computer-based memory device (e.g., 104 or 106 in FIG. 1). The stored data associated with the finite element model may reflect one or more properties of the underlying object or objects that the finite element model represents. When the finite element model so configured, it may be used to perform simulations of the object that the finite element model represents. In this regard, a finite element model may represent any one of a variety of different objects or combinations of objects including, for example, a vehicle, a type of physical hinge, a structural support (e.g., a beam or the like), or any number of other real-world physical objects or combinations of objects. If a finite element model represents an object and the underlying data associated with the finite element indicates as such, the finite element model may be used to simulate one or more aspects or characteristics of the real-world physical object itself. For example, a finite element model representing a stent may be used to simulate the use of the stent in a real-life medical setting.

A finite element model, in a typical implementation, comprises a plurality of elements. According to an embodiment, an element may be a tessellated element of the finite element model. However, embodiments are not limited and may be employed in relation to any elements, such as triangular, quadrilateral membranes or shells, etc. According to an embodiment of the method 300, the finite element model may be defined at step 302 according to any method known in the art. Further, in embodiments, the finite element model defined at step 302 may be any such type of finite element as is known in the art. For instance, in an exemplary embodiment, the finite element model defined at step 302 may be a sheet model of a surface of a real-world object. According to an embodiment, defining the model at step 302 may include defining a finite element model in computer-based memory that reflects all (or some subset) of the known properties, e.g., the dimensions, materials, etc., of the object that the finite element model represents and the model includes several design variables (e.g., plate thicknesses). In some implementations, the design variables may represent object characteristics whose values (e.g., inches or centimeters) are to be determined (or optimized). Further, the behavior of the finite element model may be governed by an equation that includes a respective sensitivity equation for the design variables, e.g., plate thicknesses. In such an embodiment, defining the finite element model may include defining the equation that governs behavior of the model, i.e., the object that the model represents.

Figure 18:
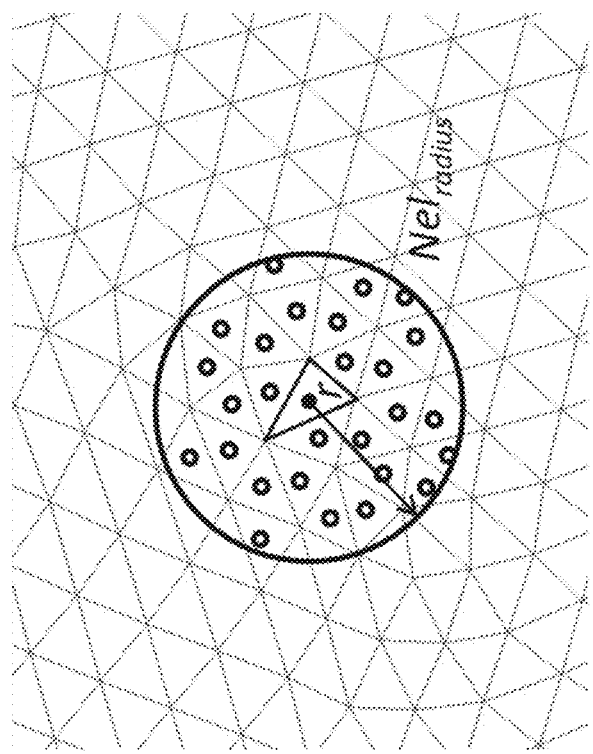
FIG. 18 shows a sphere having a radius r in a finite element model of a real-world physical object being designed, with centroids identified for each respective finite element in the model.

The method 300 continues at 304 with identifying a vicinity or region (e.g., a sphere with a given radius, see, e.g., FIG. 18) in the real-world model and/or corresponding finite element model to be considered in connection with the associated optimization process.

Figure 11:
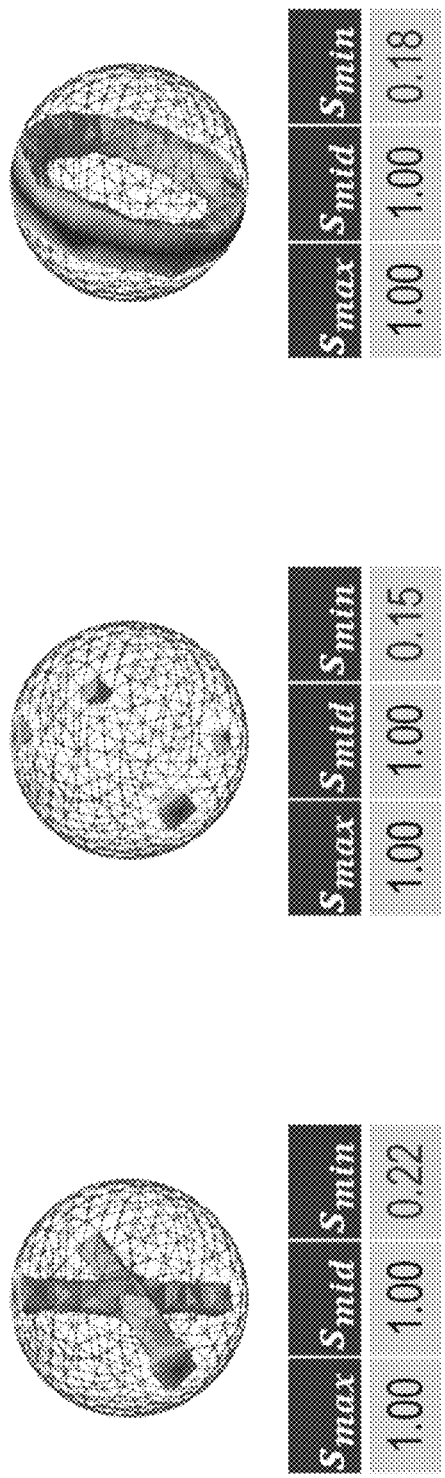
FIG. 11 shows having two normalized singular values being 1 and one normalized singular value close to zero for a relative density field as design variables for example for topology optimization representing assemblies of 1D or 0D parts in a 2D space.

Dimensionality of an object calculated using singular values generally describes how much space the object needs within a considered vicinity (e.g., a sphere). Therefore, the size of the vicinity (e.g., sphere) should be properly chosen depending on the specific applications. In some implementations, rather small spheres (radius=2-5×finite element size) should be applied for locally controlling the structural dimensionality. In some implementations, for practical applications using larger spheres can lead to misinterpretation of the structural dimensionality for the optimization. For example, as shown in FIG. 10 and FIG. 11, an assembly of 1D or 0D parts can be interpreted as a 3D object or as 2D object. If such geometrical interpretations are intended or not generally depends on the specific design applications.

For finite element models described in 3D space, the finite elements of the structure (or a selected vicinity of the structure) can be represented using matrices containing nodes and corresponding coordinates for each node. These matrices may be stored, for example, in computer-based memory 104.

Next, the illustrated method 300 includes evaluating 306, using Singular Value Decomposition (SVD), a distribution of the design variable throughout the vicinity of the real-world object, based on each finite element within the vicinity of the object/finite element model. In some implementations, singular value decomposition (SVD) may refer to a factorization of a real or complex matrix that generalizes, e.g., an eigen decomposition of a square normal matrix to any m×n matrix via an extension of the polar decomposition. Specifically, the singular value decomposition of an m×n real or complex matrix M is a factorization of the form UΣV*, where U is an m×m real or complex unitary matrix, Σ is an m×n rectangular diagonal matrix with non-negative real numbers on the diagonal, and V is an n×n real or complex unitary matrix.

Next, the illustrated method 300 includes determining 308 singular values (e.g., $s_{max}$, $s_{min}$, and $s_{min}$, alternatively referred to as $s_1$, $s_2$, and $s_3$, respectively) and corresponding orientations for the design variable within the vicinity of the real-world object based on the SVD evaluation. In the context of topology optimization, for example, the distribution of the design variable (e.g., relative densities) around each finite element (a sphere with a given radius, see FIG. 4A or FIG. 18) can be evaluated using the SVD. The obtained singular values ($s_{max}$, $s_{mid}$, $s_{min}$, see FIG. 4E) are related to three geometric dimensions of the object described by the density field of the considered vicinity (sphere). These measured values can be used, for example, to construct design responses for structural optimization.

Referring again to FIG. 3A, the method 300 includes defining 310 optimization constraints for the vicinity based on the singular values.

FIG. 3B represents one exemplary method 300a of defining 310 optimization constraints for the vicinity based on the singular values.

In a typical implementation, the measures $s_1$, $s_2$, $s_3$ are discontinuous between optimization iterations and cannot directly be used in gradient based optimization algorithms. This may be resolved in some instances using smooth approximations. In this regard, the method 300a includes applying 310a a smoothing approximation to each of the singular values associated with the design variable within the vicinity of the real-world object based on the SVD evaluation.

Next, the method 300a of FIG. 3B includes identifying 310b an additional value by performing an SVD of a matrix where all elemental design variable values are set to 1.0. This value generally represents the maximum possible dimension of the considered object (or vicinity of the object) and can be used to calculate relative singular values.

The method 300b then includes defining 310c, in computer-based memory, optimization constraints for each vicinity utilizing the smoothing approximations and the additional value.

Referring again to FIG. 3A, the method 300 includes iteratively optimizing the finite element model (at 312). In a typical implementation, this includes restricting dimensions of the finite element model based on the defined optimization constraints (which were defined based on singular values, SVDs). The iterative optimizing at step 312 results in an optimized topology associated with the given element of the finite element model. According to an embodiment, the iterative optimizing, i.e., iterative design process, of step 312 is a process of the selection of a new improved solution (with regard to an objective and constraints defined through design responses) per optimization iteration.

After the iterative optimizing at step 312, properties of the given element of the finite element model are automatically updated to reflect the optimized value of the sizing design variable at step 314. In this way, the method 665 creates an optimized model of the real-world object for manufacturing. When the optimized design variables, i.e., optimized values of the design variables, have been determined then the optimized finite element model can be converted into a format and submitted to real manufacturing processes where the local control of design patterns on surfaces is important for fulfilling manufacturing constraints and the obtained design is directly manufactured. In embodiments, through controlling the local volume constraints, constraints for the design can be set that comply with real-world limitations of manufacturing processes and thus, embodiments determine optimized designs for manufacturing real-world objects. An embodiment of the method 300 determines optimized topology, for example, for multiple elements of the finite element model. In this way, such an embodiment can determine an optimized design for manufacturing the entire real-world object.

Next, in the illustrated embodiment, the method 300 includes causing the real-world object to be manufactured (at 316) according to the optimized model. In one such embodiment, after the model is updated at step 314, the updated model is digitally communicated to a manufacturing machine (e.g., an additive manufacturing machine, such as a 3D printer) capable of producing the real-world object according to the optimized model. In an embodiment, the digital model is communicated using any communication method known in the art and may be communicated to any manufacturing machine known in the art, such as an additive manufacturing machine, stamping machine or a computer numerical control (CNC) machine.

What follows is a discussion of the techniques disclosed herein applied in the context of topology optimization, where the distribution of a design variable (relative densities) around each finite element (e.g., a sphere with a given radius, see FIG. 4a or FIG. 18) is evaluated using Singular Value Decomposition (SVD), and where the obtained singular values (e.g., $s_{max}$, $s_{mid}$, $s_{min}$, see FIG. 4e) are related to three geometric dimensions of the object described by the density field of the considered sphere. These measured values are, in a typical implementation, used to construct design responses for structural optimization.

For finite element models described in 3D space, the finite elements $E_i$ of the structure can be represented using the matrices $E(N_{ij})$ and $N(x_l, y_l, z_l)$ containing the nodes $N_{ij}$ and the corresponding coordinates $(x_l, y_l, z_l)$ for each node $N_l$.

$$E = \begin{bmatrix} N_{11} & \cdots & N_{1n} \\ \vdots & & \vdots \\ N_{m1} & \cdots & N_{mn} \end{bmatrix} \in \mathbb{R}^{m \times n}, N = \begin{Bmatrix} x_1 & y_1 & z_1 \\ \vdots & & \vdots \\ x_o & y_o & z_o \end{Bmatrix} \in \mathbb{R}^{o \times p}$$

where m is the number of elements, n is the number of nodes for each element, o is the overall number of nodes, and p is the number of dimensions.

For the evaluation in a given vicinity of the radius R (see FIG. 4a or FIG. 18) around each element $E_j$, the neighboring elements and their centroids (see FIG. 4c) are determined using:

$$E_j^{neighbor} = \{j \mid \|C_e - C_j\|_2 \leq R\} = E_j^{neighbor} = \begin{bmatrix} E_1 \\ \vdots \\ E_k \end{bmatrix}$$

and the centroids:

$$C_j^{neighbor} = \begin{bmatrix} \bar{x}_1 & \bar{y}_1 & \bar{z}_1 \\ & \vdots & \\ \bar{x}_k & \bar{y}_k & \bar{z}_k \end{bmatrix}.$$

Additionally, the relative elemental densities $$\rho_j^{neighbor} = \begin{bmatrix} \rho_1 \\ \vdots \\ \rho_k \end{bmatrix}^T$$

for each neighbor are stored (see FIG. 4b).

In a typical implementation, the centroids need to be centered around their mean $\hat{C}_j^{neighbor} = C_j^{neighbor} - 1^{k \times 1} \overline{C}_j$ for performing the SVD. This generally corresponds to a shift of the global coordinate system to the center of the sphere.

The singular values ($s_1$, $s_2$, $s_3$) for each vicinity can then be obtained through SVD of the matrix $X_j$, where $$X_j = \begin{bmatrix} \hat{x}_1 \rho_1 & \hat{y}_1 \rho_1 & \hat{z}_1 \rho_1 \\ & \vdots & \\ \hat{x}_k \rho_k & \hat{y}_k \rho_k & \hat{z}_k \rho_k \end{bmatrix}.$$

A graphical representation of this matrix is shown in FIG. 4d. Here, all centroids with low relative densities are moved to the center of the sphere. As a byproduct, the singular vectors may also be calculated (shown as vectors in FIG. 4e) which represent the directions of the major dimensions of the object described by the considered design variable density field. The measures $s_1$, $s_2$, $s_3$ may also be referenced by $s_{max}$, $s_{mid}$, $s_{min}$ since they are usually ordered by their magnitudes ($S_{max} \geq s_{mid} \geq S_{min}$).

Figure 5:
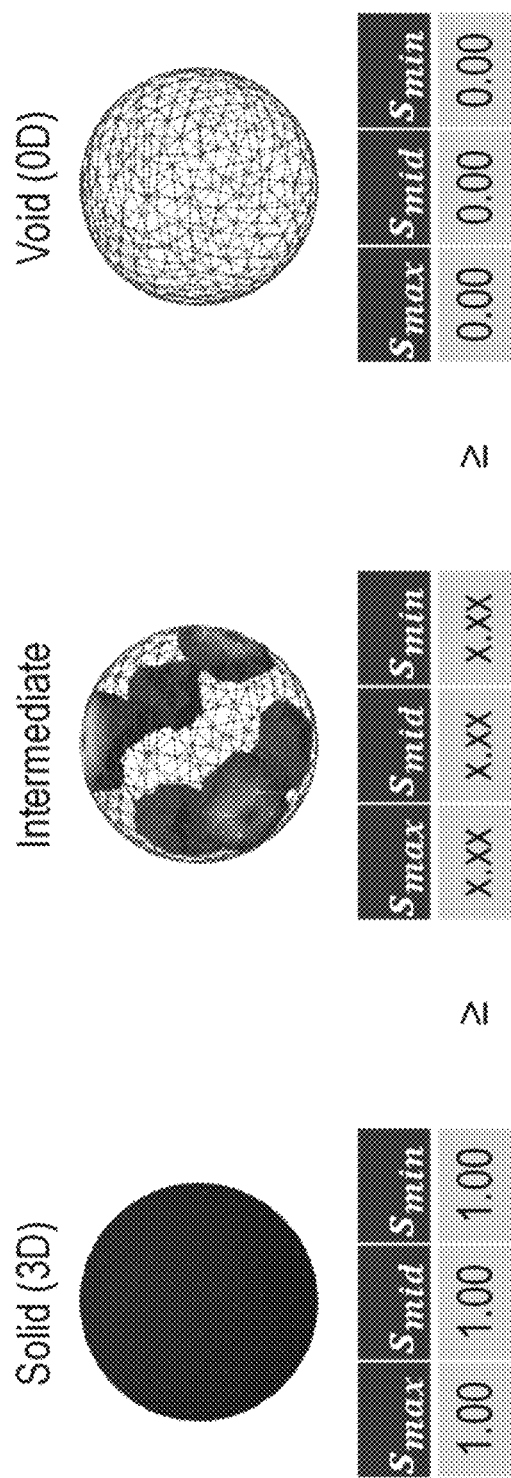
FIG. 5 shows a Solid (3D object representation) versus void (0D object representation) versus an intermediate (between 3D and 0D object representation) for the normalized singular values of a relative density field as design variables for example for topology optimization.

In FIG. 5 to FIG. 11, the normalized values $s_{max}$, $s_{mid}$, $s_{min}$ are shown for different exemplary structural layouts of the design variables in a finite elements setting for topology optimization. All the normalized singular values are equal to 1.0 for a solid sphere and are equal to 0.0 for a void sphere correspondingly as shown in FIG. 5. The singular values are between 0.0 and 1.0 for all other configurations.

Figure 6:
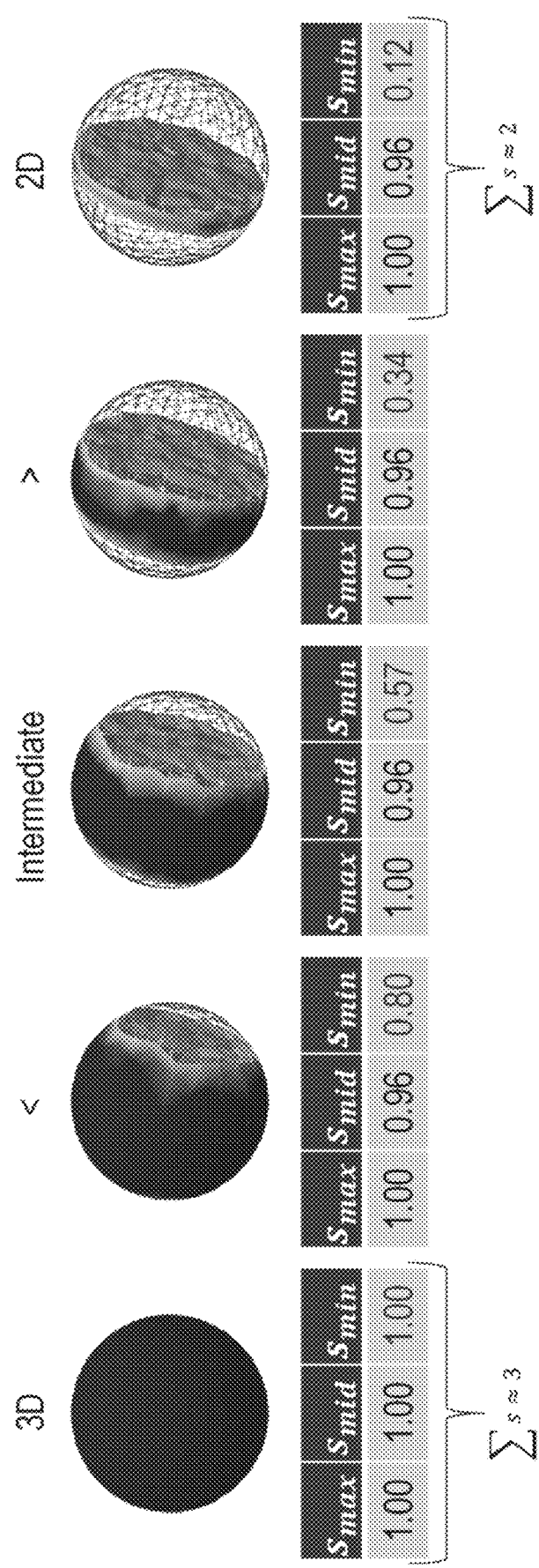
FIG. 6 shows a Solid (3D object representation) transforming to a shell, plate, or membrane layout (2D object representation) for the normalized singular values of a relative density field as design variables for example for topology optimization.

FIG. 6 shows a Solid (3D object representation) transforming to a shell, plate, or membrane layout (2D object representation) for the normalized singular values of a relative density field as design variables for example for topology optimization. One of the singular values approaches zero when a 3D object transforms to a 2D object as shown in FIG. 6.

Figure 7:
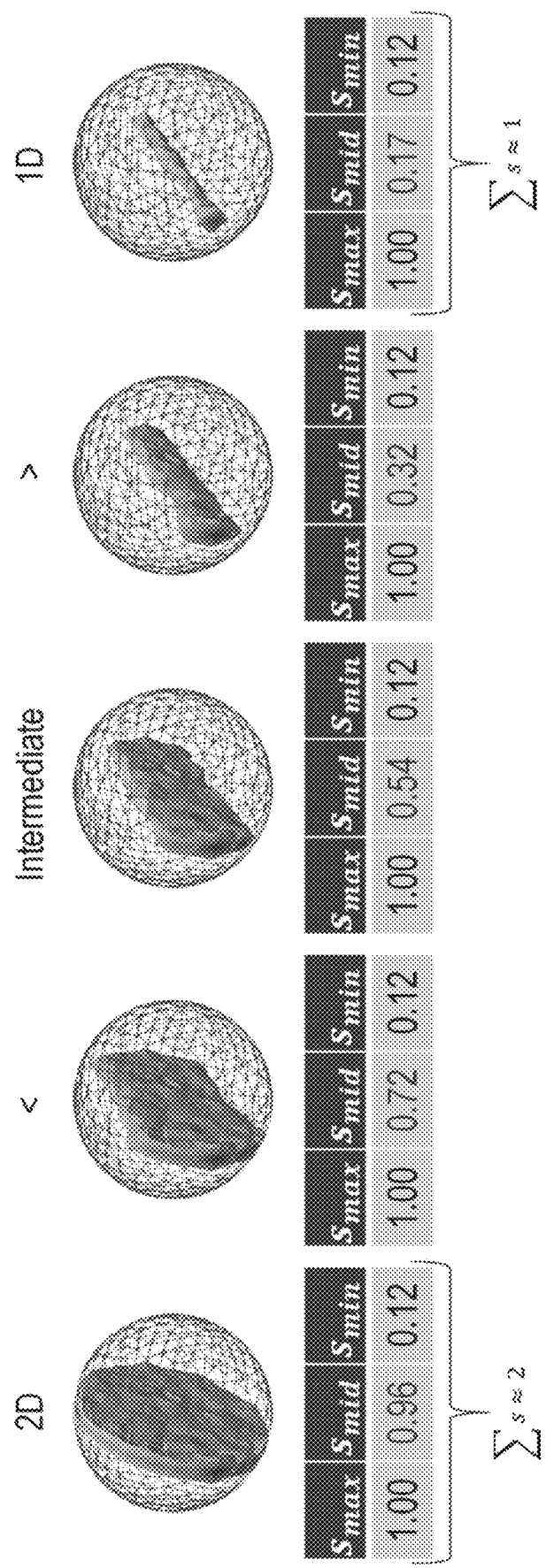
FIG. 7 shows a shell, plate, or membrane layout (2D object representation) transforming to a beam, bar, or lattice layout (1D object representation) for the normalized singular values of a relative density field as design variables for example for topology optimization.

FIG. 7 shows a shell, plate, or membrane layout (2D object representation) transforming to a beam, bar, or lattice layout (1D object representation) for the normalized singular values of a relative density field as design variables for example for topology optimization. Two singular values approach zero when a 2D object is transforming to a 1D object as shown in FIG. 7.

Figure 8:
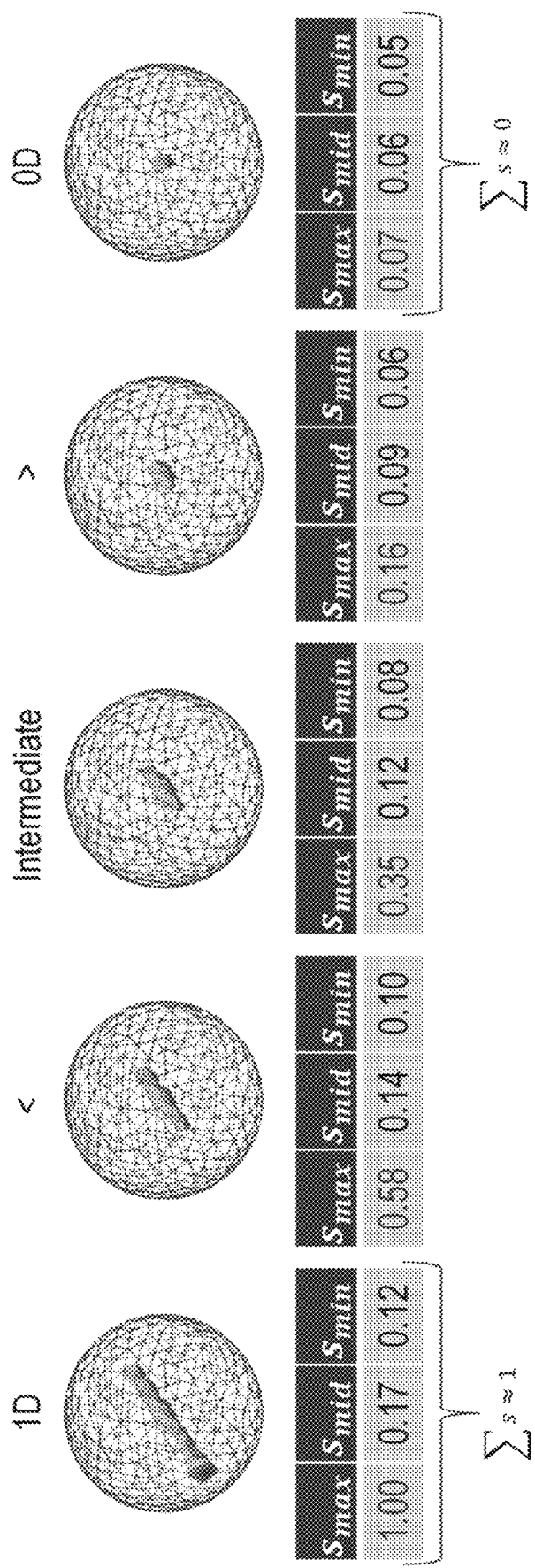
FIG. 8 shows a beam, bar, or lattice layout (1D object representation) transforming to an almost void layout (0D object representation) for the normalized singular values of a relative density field as design variables for example for topology optimization.

FIG. 8 shows a beam, bar, or lattice layout (1D object representation) transforming to a void layout (0D object representation) for the normalized singular values of a relative density field as design variables for example for topology optimization. All singular values approach zero when a 1D object transforms to an empty sphere (void) as shown in FIG. 8.

Figure 9:
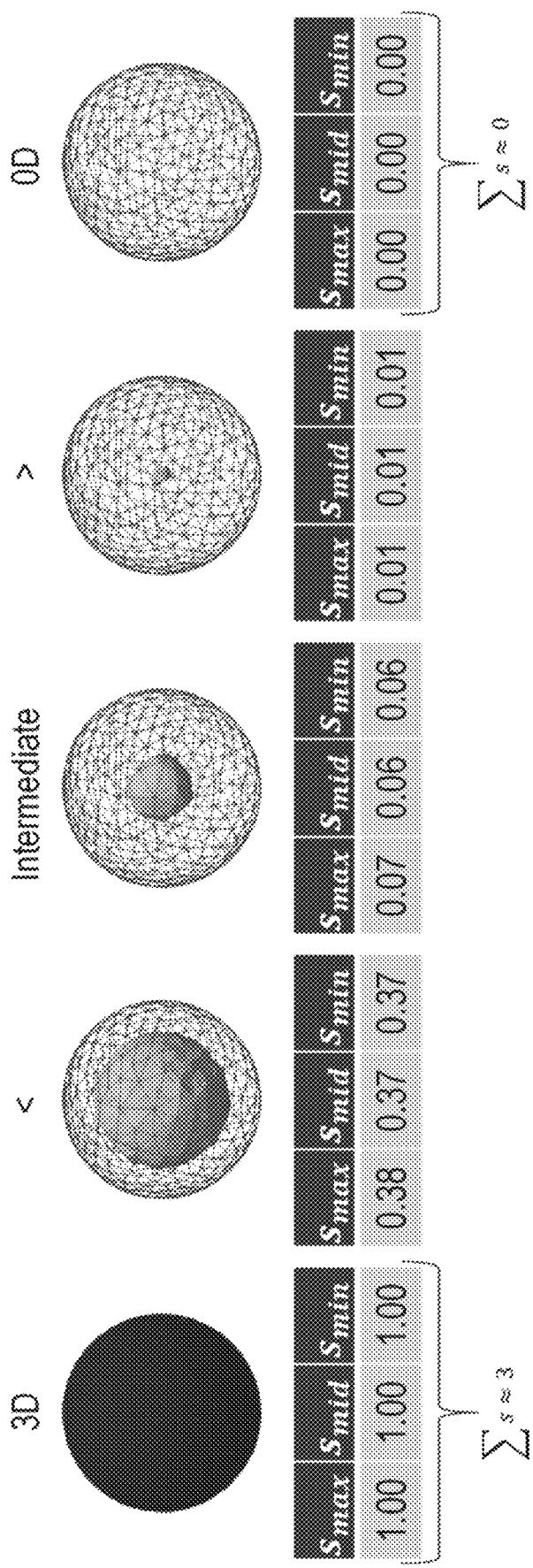
FIG. 9 shows a solid (3D object representation) transforming to a void layout (0D object representation) for the normalized singular values of a relative density field as design variables for example for topology optimization.

FIG. 9 shows a solid (3D object representation) transforming to a void layout (0D object representation) for the normalized singular values of a relative density field as design variables for example for topology optimization. All singular values approach zero when a 3D object transforms to an empty sphere (void) as shown in FIG. 9.

FIG. 10 shows normalized singular values all being 1 for a relative density field as design variables for example for topology optimization representing assemblies of 1D or 0D parts in 3D space.

FIG. 11 shows having two normalized singular values being 1 and one normalized singular value close to zero for a relative density field as design variables for example for topology optimization representing assemblies of 1D or 0D parts in 2D space.

As mentioned above, dimensionality of the object calculated using singular values describes how much space the object needs within the considered vicinity (sphere). Therefore, the size of the sphere must be properly chosen depending on the specific applications. Frequently, rather small spheres (radius=2-5×finite element size) should be applied for locally controlling the structural dimensionality. Frequently, for practical applications using larger spheres can lead to misinterpretation of the structural dimensionality for the optimization. For example, as shown in FIG. 10 and FIG. 11, an assembly of 1D or 0D parts can be interpreted as a 3D object or as 2D object. If such geometrical interpretations are intended or not may depend, for example, on the specific design applications.

Thus, FIG. 5-FIG. 11 show that the singular values can be applied for controlling and enforcing given types of forms and shapes of the design variable layout. In a typical implementation, the system 100 is configured to apply singular values in just this way to control and enforce various different types of forms and shapes in a topology optimization, for example. This has never been applied for controlling the forms, shapes of the design variables and layout for a non-parametric optimization and is a unique aspect of the present approach.

The measures $s_1$, $s_2$, $s_3$ are discontinuous between the optimization iterations and cannot directly be used in gradient based optimization algorithms. In a typical implementation, this is resolved using smooth approximations as the following:

$$s_{max} \approx \text{smooth\_max}(s_j), \quad s_{min} \approx \text{smooth\_min}(s_j)$$

$$s_{mid} \approx \left(\sum_{i=1}^{3} s_i\right) - s_{max} - s_{min}.$$

Moreover, in a typical implementation, an additional value, $\hat{s}_{max} = s_{max}(\rho=1)$ is obtained by performing SVD of $X_j$ with all elemental design variable densities set to 1.0. This value represents the max possible dimension of the considered object and can be used to calculate relative singular values.

The optimization constraints for each vicinity (sphere around each finite element being equivalent to the design variable field) can then be defined as:

Constraints: A, B and C:

$$\frac{s_{min}}{\hat{s}_{max}} \le q_A, \quad \frac{s_{mid}}{\hat{s}_{max}} \le q_B, \quad \frac{s_{mid}}{s_{max}} \ge q_C.$$

The quantity $q_A$ restricts the smallest local dimension of the structure whereas $q_B$ restricts the second largest. The value $q_C$ sets a relation between the largest and second largest dimension. To reduce the number of constraints for the optimization (to avoid constraints for each finite element being equivalent to the design variable), the left sides of the above constraints are aggregated (to obtain just single constraints of type A, B and C covering all or a subset of the finite elements and thereby, all or a subset of the design variables) using smooth maximum/minimum approximated aggregation functions. The right sides of the constraints are the constrained values. Thus, the following constraints can be used locally to enforce the optimized designs to have certain dimensionality:

1) 1D or 2D: constraint of type A with $q_A \ll 1.0$ (e.g. 0.1)
2) 1D: constraints of type A and B with $q_A \ll 1.0$ and $q_B \ll 1.0$
3) 2D: constraints of type A and C with $q_A \ll 1.0$ (e.g. 0.1) and $q_C \gg 0.0$ (e.g. 0.6)

In some implementations, the left sides of the above constraints may be implemented as design responses in existing structural optimization solutions either for defining constraints or as objective terms. Typically, the derivatives of the smoothed constraints with respect to the design variables (relative densities) may be needed during the optimization process and can be obtained by differentiating the above equations.

Generally, the techniques disclosed herein use sensitivity optimization for geometrical dimensionality control of design variables. This may be done by looping all design variables (DVs), identifying the other neighboring design variables for which the geometrical dimensionality control is enforced for a given design variable (DV), calculating singular values (SVD) and sensitivities (also called derivatives) for each given design variable (DV) (405) and calculating design responses (DRESPs) and sensitivities using one or more aggregation functions for the design variables (DVs) (407). An aggregation function is a function whereby multiple different values are grouped together to form, for example, one single summary value.

Figure 15:
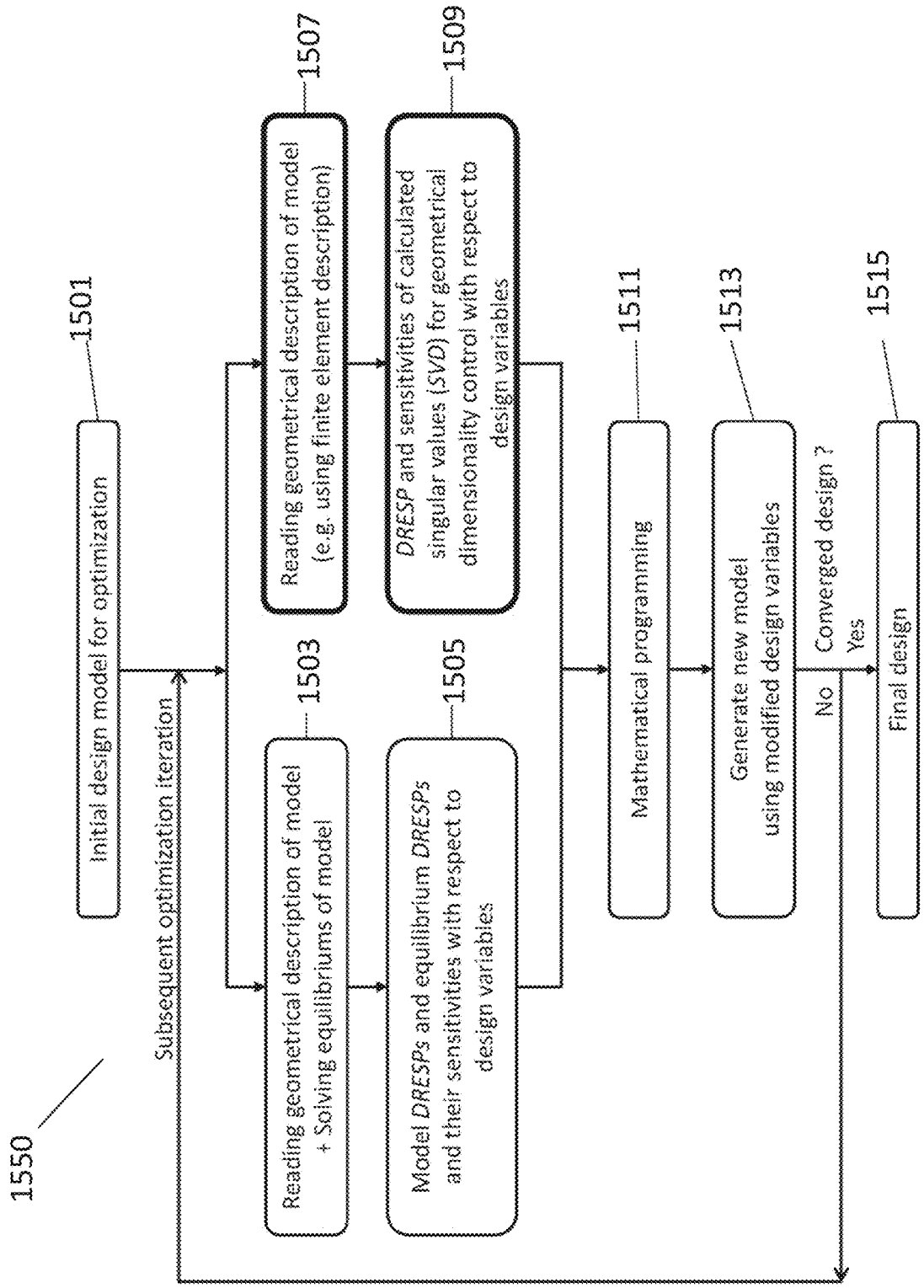
FIG. 15 is a flowchart that includes using design responses (DRESPs) and sensitivities of calculated singular values (SVDs) for geometrical dimensionality control with respect to design variables.

FIG. 15 depicts an iterative design process 1550 that involves constraining design values based on singular value decomposition (SVD) of design variables according to an embodiment.

The process 1550, according to the illustrated embodiment, accounts for the design response (DRESP) and sensitivities of calculated singular values (SVD) for geometrical dimensionality control with respect to design variables. The iterative design process scheme 1550 can be implemented, for example, in a predefined workflow of a computer-aided engineering (CAE) system. The method 1550 begins at step 1501 with creating an initial model that includes, for example, various loading and boundary conditions for equilibriums for optimization. In an embodiment, the model is defined by a designer (e.g., a designer entering data at a computer, such as computer 100 depicted in FIG. 1, via one or more I/O devices connected to I/O device interface 110). The model is then subjected to an iterative design process through the steps 1503-1513.

According to the illustrated embodiment, a design iteration cycle may include a processor (e.g., CPU 102 in FIG. 1) reading data representing a geometrical description of the model from memory (e.g., 104 from FIG. 1) and solving equilibriums of the model (at 1503). Then, the processor for example may model the design responses and equilibrium design responses and their sensitivities with respect to the design variables (at 1505).

According to the illustrated embodiment, each design iteration cycle may include the processor reading a geometrical description of the model (e.g., the finite element model) (at 1507). Then, the processor for example may determine design responses and sensitivities of calculated singular values (SVD) for geometrical dimensionality control with respect to design variables (at 1509).

In a typical implementation, a design response defines a response for the current analysis model of a given optimization iteration. Thereby, a typical implementation, a design response may extract one scalar value which can be a direct measure from the model (e.g., mass, center of gravity, etc.) or may be determined by the results of the primal solutions for the equilibriums of the model (e.g., stresses, displacements, reaction forces, etc.).

The design responses are then applied to define an optimization problem consisting of constraints which have to be fulfilled and an objective function which is optimized. The optimization problem is solved using mathematical programming at step 1511. In a typical implementation, the mathematical programming, i.e., optimization computation, is strictly based upon the values of the user defined design targets, design responses, and the sensitivities of the design responses. Thus, if the design responses and sensitivities of the calculated singular vales (SVD) for geometrical dimensionality control with respect to design variables are included in the iterative design process then, in some implementations, these may help enforce a local control of design characteristics and at the same time also enhance physical properties for the other design responses applied in the optimization setup.

In mathematics, computer science, and operations research mathematical programming is alternatively named mathematical optimization or simply optimization and is a process of the selection of a best solution (with regard to some criterion) from some set of available alternatives. Embodiments of the method 1550 may use any such mathematical programming as is known in the art. In a typical implementation, the processor may implement functionalities associated with the mathematical programming by executing computer-readable mathematical programming instructions stored in memory.

After the mathematical programming at step 1511, a new physical model for the next optimization iteration is generated at step 1513 based upon the design variables determined at step 1511. The iterative design process is a process of the selection of a new improved solution (with regard to some objective and constraints) per optimization iteration. Sometimes, the design variables determined at step 1511 and the physical model variables that are updated at step 1513 are the same. If the physical model variables and design domain variables are the same, the physical model at step 1513 is simply obtained as an output of the mathematical programming. Otherwise an additional step is necessary to interpret the design variables as physical model variables through the use of filters, as known in the art.

To continue, it is determined if the optimization is converged. Convergence is numerically determined when the change in an objective function from one optimization iteration to a subsequent optimization iteration is smaller than a sudden threshold and the relative summed change in the design variables from one optimization iteration to a subsequent optimization iteration is smaller than a sudden threshold. If the optimization has not converged, a new optimization cycle is started and the method 1550 returns to steps 1503 and 1507. If the optimization has converged, a final design is created at step 1515. For the converged design, the constraints for the design responses should be fulfilled and the objective function should be optimized.

The method 1550 and its output final design 1515 can be employed for a variety of real-world objects to determine optimized designs for manufacturing.

A practical application of these techniques may be understood in the context of introducing local constraints for gradient based topology optimization to locally enforce predefined dimensionality of structural components. The constraints in this example are based on principal values (singular values) from a singular value decomposition (SVD) of point clouds represented by elemental centroids and corresponding non-parametric design variables (e.g., relative density) for enforcing dimensionality control in design optimization of the real-world object.

Figure 16D:
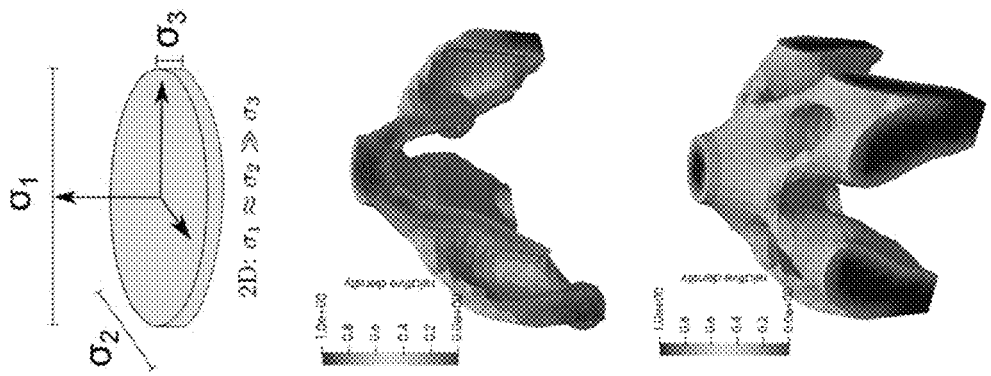
FIG. 16D shows dimensionality control in topology optimization enforcing 2D structural subcomponents.
Figure 16C:
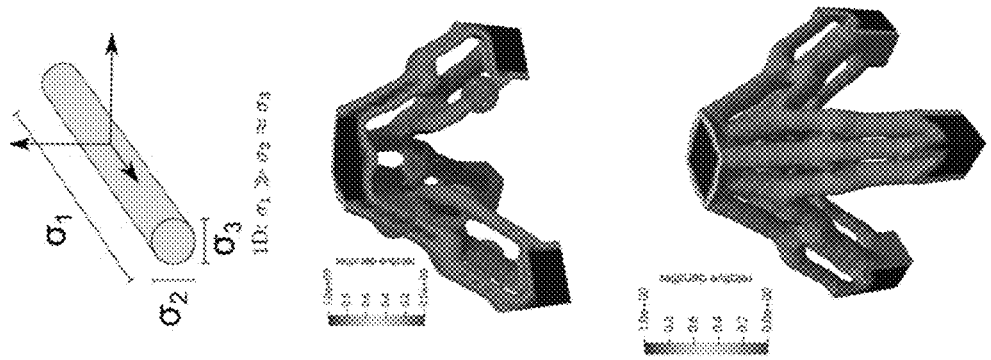
FIG. 16C shows dimensionality control in topology optimization enforcing 1D structural subcomponents.
Figure 16B:
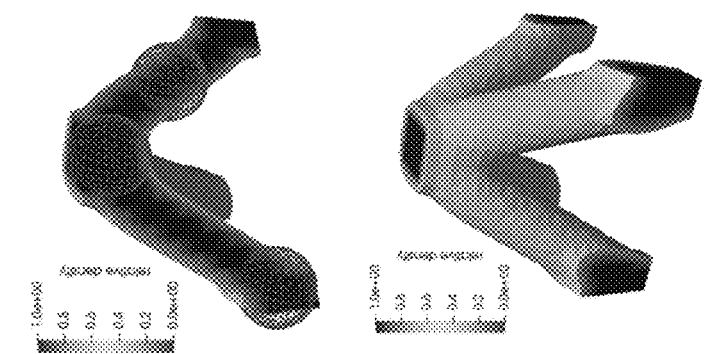
FIG. 16B shows topology optimization without geometrical dimensionality control.
Figure 16A:
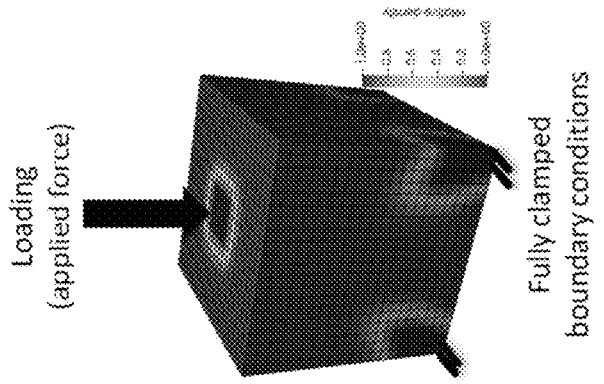
FIG. 16A shows a design space for topology optimization subdivided into finite elements where the relative density of each element is a design variable where each lower corner is fully clamped, and the mid top points are loaded.

As an example, FIG. 16A is a schematic representation showing a very coarse finite element (FE) model of a simple cube clamped at the bottom corners of the cube and with a downward force (loading) being applied to center of the cube's upper surface. Topology optimization minimizing compliance subjected to a volume constraint may yield the design of FIG. 16B. No additional constraints for geometrical dimensionality are applied in that design. The structural components shown therein are rather bulky and thick within a given radius of a search vicinity (see, e.g., the spheres outlined on the object design shown in FIG. 16B). In some implementations, geometrical properties of the optimized structure can be investigated locally considering vicinities (see, e.g., the spheres shown in FIGS. 16B-16D) with some predefined radius at certain locations depending on the design requirements. Relatively to the present radius then the considered structural components are rather bulky and thick in a 3D space. Adding additional constraints based on the SVD values to the optimization problem then 1D and 2D structures can be enforced locally for the optimized result as shown in FIG. 16C and FIG. 16D, respectively. Again, the dimensionality assessment in a typical implementation is relative with respect to the predefined radius of the considered vicinity. In this regard, FIG. 16C shows a locally enforced 1D lattice structure and FIG. 16D shows a locally enforced 2D membrane structure.

The computer-based methods disclosed herein can be applied to a variety of real-world design applications.

For example, in various implementations, the computer-based methods can be employed to help fulfill design requirements for various manufacturing processes, such as those involving: 1) thin-walled structures for deep drawing using topology optimization, with enforced 2D SVD constraints (see, e.g., FIG. 16D); 2) thin-walled welded structures, with enforced 2D SVD constraints; 3) avoiding bulky areas for cooling control of the metallic porosity of casted components, with enforced 1D and 2D SVD constraints; 4)

orientation of structural components, e.g., for ribs and lattice designing, enforced orientation or ensure molding form, with enforced 1D (see, e.g., FIG. 16C) and 2D SVD constraints (see, e.g., FIG. 16D), respectively; 5) ensuring removability of powder for 3D printing, with enforcing 1D SVD constraints (see, e.g., FIG. 16C); 6) ensuring 3D continuous fiber printing (see, e.g., FIGS. 17A and 17B) where subcomponents are attaching or splint in branches with no crossing fibers, with enforcing 1D SVD constraints.

Figure 17B:
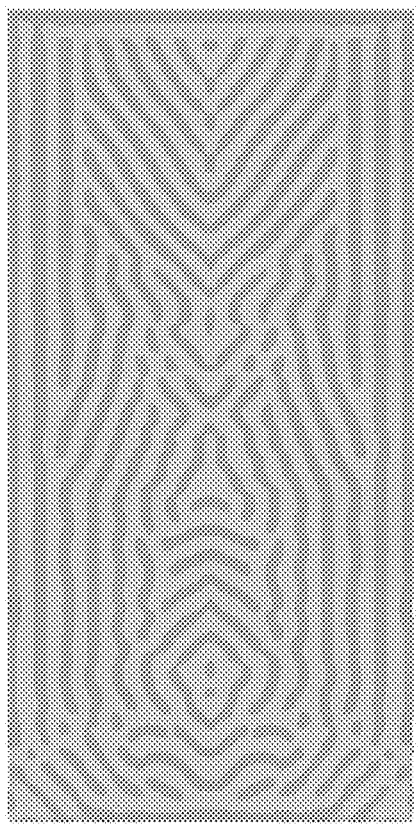
FIG. 17B shows dimensionality control in topology optimization enforcing 1D structural subcomponents representing fibers which are not crossing each other; the topology optimized result is represented by an iso-surface description of the relative density field.
Figure 17A:
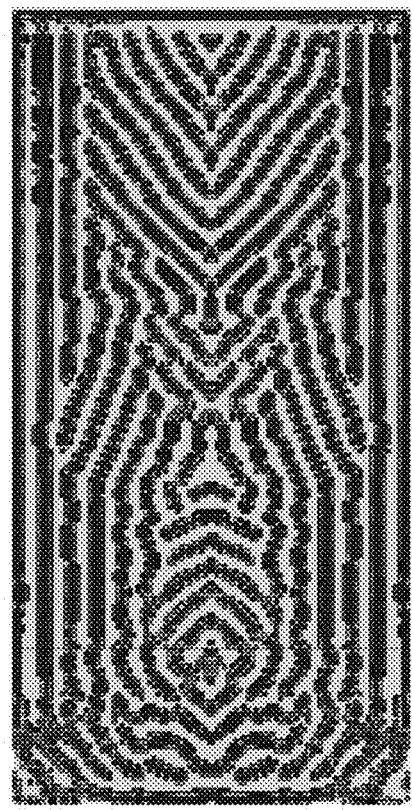
FIG. 17A shows dimensionality control in topology optimization enforcing 1D structural subcomponents representing fibers which are not crossing each other; the topology optimized result is represented by finite elements having solid and intermediate relative densities

The exemplary schematic representations in FIGS. 17A and 17B represent dimensionality control in topology enforcing 1D structural subcomponents representing fibers which are not crossing each other. The topology optimized result is represented in FIG. 17A by finite elements having solid and intermediate relative densities. The topology optimized result is represented in FIG. 17B by an iso-surface description of the relative density field.

In some implementations, the methods may help ensure the easy removability of powder in an object that is to be manufactured using additive manufacturing techniques, such as 3D printing.

Geometrical Dimensionality Control in Topology Optimization

1. GENERAL

This section discusses particular implementations that involve the introduction of additional constraints for gradient based topology optimization to locally enforce predefined dimensionality of structural components. These constraints are based on the principal values (singular values) from a singular value decomposition (SVD) of points clouds represented by elemental centroids and the corresponding relative density design variables.

2. TOPOLOGY OPTIMIZATION IMPLEMENTATION AND WORKFLOW

In an exemplary implementation, the geometrical control techniques disclosed herein (e.g., imposed by constraining the singular values of the decomposition (SVD) on the design variables) is implemented in the optimization software SIMULIA Tosca Structure using mathematical programming for updating the design variables and the adjoint sensitivities implemented in SIMULIA Abaqus of the structural finite element modeling. The direct solver in SIMULIA Abaqus is applied for solving the equilibrium R=0 of the finite element model and the adjoint solution except for the numerical results shown in section 5.2 and 5.3 where the iterative algebraic multi-grid solver by SIMULIA Abaqus is applied. Note that both the direct finite element solver and the iterative algebraic multi-grid solver can solve non-linear structural modeling as contacts, large deformations and constitutive non-linear material models. However, here we show linear applications.

Furthermore, all the present numerical topology optimization results use the so-called SIMP-model (Solid Isotropic Material with Penalization) for modeling the constitutive material model as being proportional to a power-law of the relative elemental density $\rho$, a vector containing the design variables of all structural design elements in the design domain.

Additionally, first the present numerical optimization results (sections 5.1, 5.2 and 5.4) will have the following optimization framework of minimizing the compliance C (maximizing the stiffness) for the external loading P and resulting displacements U:

Minimize compliance $C = P^T U(\rho) \xrightarrow[\rho \in \mathbb{R}^n]{} \min$ s.t.
Structural equilibrium constraint
$R(\rho, U(\rho)) = 0$, (1)
Relative mass constraint
$m(\rho) \leq m_{full} f$.
Constraints on singular values
$\bar{s}_{min}(\rho)$, $\bar{s}_{mid}(\rho)$ and $\bar{e}_{mid2max}(\rho)$.

Minimize compliance $C = P^T U(\rho) \xrightarrow[\rho \in \mathbb{R}^n]{} \min$ (1)

s.t. Structural equilibrium constraint $R(\rho, U)(\rho)) = 0$,

Relative mass constraint $m(\rho) \leq m_{full} f$.

Constraints on singular values $\bar{s}_{min}(\rho)$, $\bar{s}_{mid}(\rho)$ and $\bar{s}_{mid2max}(\rho)$.

The total mass m($\rho$) of the design domain is constrained to fulfill a certain weight target defined by the relative material fraction f and $m_{full}$ being the mass of the design domain having full material. A sensitivity filter is applied for regularization introducing a length-scale and for suppressing checkerboards. The radius of the sensitivity filter for all present optimization results is 1:3 compared to the average element size for all elements specified in the design domain.

Secondly, the mass is the design response to be minimized as objective function for the strength optimization applied in section 5.3. Furthermore, the constrained design response is the Von-Mises stress $s_v$ ($\rho$, U($\rho$)) of the elemental integration points being applied as a single aggregated constraint A ($s_v$ ($\rho$, U($\rho$))) as the following:

Minimize mass m($\rho$) (2)
s.t.
Structural equilibrium constraint
$R(\rho, U(\rho)) = 0$,
Stress constraint
$A(s_v (\rho, U(\rho))) \leq s_C$,
Constraints on singular values
$\bar{s}_{min}(\rho)$, $\bar{s}_{mid}(\rho)$ and $\bar{s}_{mid2max}(\rho)$.

where $s_c$ is stress constraint value. The stress design response sv($\rho$, U($\rho$)) in equation 2 is applied using a relaxation. Additionally, an aggregation function A($s_v$ ($\rho$, U($\rho$))) in the form of a p-norm approach is applied for the elemental stress points for avoiding having a stress design response per elemental stress integration point.

3 CALCULATION OF GEOMETRICAL PROPERTIES OF LOCAL STRUCTURAL COMPONENTS USING SVD

The present approach applies the definition of new measures used as design responses for topology optimization. These measures can either be applied in the objective function or as optimization constraints in order to locally enforce a preferred geometrical layout of the optimized structures. Mathematically, the measures are based on singular values (or the corresponding vectors) of a matrix describing the design variables distribution within a given vicinity (for example a sphere having a given radius). In the context of topology optimization then the distribution of the design variables (relative densities) around each finite element (a sphere with a given radius, see FIG. 4A) is evaluated using Singular Value Decomposition (SVD). The obtained singular values ($s_{max}$, $s_{mid}$, and $s_{min}$, see FIG. 4E) are related to three geometric dimensions of the object described by the density field of the considered sphere. These measured values can be used to construct design responses for structural optimization enforcing local geometrical control.

3.1 Singular Values of a Relative Density Field

In following we assume that for a given finite element mesh with n finite elements then the corresponding centroid coordinates:

$$C \in \mathbb{R}^{n \times 3}$$

defined as $$C = \begin{bmatrix} x_1 & y_1 & z_1 \\ \vdots & \vdots & \vdots \\ x_n & y_n & z_n \end{bmatrix} \quad (3)$$

and the relative densities $$\rho \in \mathbb{R}^n$$

where $0.0 < \rho_i \leq 1.0$ are given for each optimization iteration. For the evaluation of geometrical properties of structural components (FIG. 4A), represented by the relative density field (FIG. 4B), in a given vicinity with the radius R around a finite element $e \in \{1, \ldots, n\}$ then the m neighboring elements $j \in \{1, \ldots, m\}$ and their centroids $$\check{C} \in \mathbb{R}^{m \times 3}$$

(FIG. 4C), are determined by the following condition $$\|C_e - C_j\| \leq R. \quad (4)$$

The quantities Ce and Cj corresponds to the e-th and j-th lines of C. The corresponding relative densities are represented by $$\check{\rho} \in \mathbb{R}^m.$$

The data stored in $\hat{C}$ must be centered around its mean before applying SVD as:

$$\hat{C}_j = \check{C}_j - \frac{1}{\sum_{i=1}^{m} \check{\rho}_i} \left[ \sum_{i=1}^{m} \check{x}_i \check{\rho}_i \quad \sum_{i=1}^{m} \check{y}_i \check{\rho}_i \quad \sum_{i=1}^{m} \check{z}_i \check{\rho}_i \right]. \quad (5)$$

This corresponds to a shift of the global coordinate system to the center of gravity for the considered points of the given cloud. The relative density values are now used to scale the shifted centroid coordinates stored in $\hat{C}$ as following $$\tilde{C} = \begin{bmatrix} \hat{x}_1 \check{\rho}_1 & \hat{y}_1 \check{\rho}_1 & \hat{z}_1 \check{\rho}_1 \\ \vdots & \vdots & \vdots \\ \hat{x}_m \check{\rho}_m & \hat{y}_m \check{\rho}_m & \hat{z}_m \check{\rho}_m \end{bmatrix}. \quad (6)$$

Centroid coordinates of elements representing solid material are not changed by this operation. However, elements representing intermediate material have their corresponding centroids moved in the direction of the center of gravity for the considered points in the cloud (FIG. 4D). The singular values $s_{min}$, $s_{mid}$ and $s_{max}$ defined as $s_{min} \leq s_{mid} \leq s_{max}$ for each vicinity are obtained through the SVD of the matrix as $$\tilde{C} = W \begin{bmatrix} s_{max} & 0 & 0 \\ 0 & s_{mid} & 0 \\ 0 & 0 & s_{min} \end{bmatrix} V^T, \quad (7)$$

$W \in \mathbb{R}^{m \times 3}$, $V = [v_{max} \; v_{mid} \; v_{min}]$, $v_k \in \mathbb{R}^3$ and $k \in \{min, mid, max\}$.

Solid materials can be defined by:

($\check{\rho}_j = 1.0$), whereas intermediate materials can be defined as ($\check{\rho}_j < 1.0$).

The quantities in the equation represent the major local dimensions of the object described by the considered relative density field, see FIG. 4E. The corresponding singular vectors $v_k$ represent the directions of the major dimensions and are orthogonal to each other. The matrix W contains the singular vectors which are not considered within this contribution. In following sections, we need to normalize the singular values $s_k$ by the largest singular value $\hat{s}_{max}$ of matrix $\vec{C}$ as the following $$\bar{s}_k = \frac{s_k}{\hat{s}_{max}}. \quad (8)$$

Thereby, the singular values are invariant with respect to the absolute size of the considered vicinity. Note, matrix $\hat{C}$ corresponds to matrix $\tilde{C}$ in which all the relative densities are set to $\check{\rho}_j = 1.0$ representing the largest possible instance for the local structural component for the designs.

3.2 Relation Between Singular Values and Eigenvalues

Numerous algorithms for the eigenvalue decomposition can be reused to perform the SVD calculation of the matrix $$\tilde{C} \in \mathbb{R}^{m \times}$$

if they are already available in the finite element software environments. Therefore, we introduce the square matrix $$Q = \tilde{C}^T \tilde{C} \text{ with } Q \in \mathbb{R}^{3 \times 3}. \quad (9)$$

Then, the decomposition of the matrix in equation (9)

$$Q = V \begin{bmatrix} \lambda_{max} & 0 & 0 \\ 0 & \lambda_{mid} & 0 \\ 0 & 0 & \lambda_{min} \end{bmatrix} V^T, \quad (10)$$

directly provides the singular vectors $v_k$ and the corresponding singular values obtained from the eigenvalues of the matrix Q as follows $$s_k = \sqrt{\lambda_k}.$$

3.3 Geometrical Interpretations of the Singular Values

FIG. 5 to FIG. 11 show the normalized values $$\bar{s}_k$$

for different exemplary structural layouts of the design variables (relative densities) in a finite elements setting for topology optimization. All the normalized singular values are equal to 1.0 for a fully solid sphere and are equal to 0.0 for a void sphere as shown in FIG. 5. The singular values are between 0.0 and 1.0 for all other configurations.

One of the singular values approaches zero when a fully solid 3D object transforms to a 2D object as shown in FIG. 6. In this case 2D means a shell, plate, or membrane like material layout. Two singular values approach zero when a 2D object transforms to a 1D object as shown in FIG. 7. Beam, bar, or lattice like material layouts corresponds to 1D objects.

All singular values approach zero when a 1D object transforms to an empty sphere (void) as shown in FIG. 8.

Consequently, the singular values as illustrated in FIG. 5 to FIG. 8 can be used to formulate new types of constraints for controlling and enforcing geometrical features of the optimized structures. Such constraints will be discussed in the following sections.

4 LOCALLY CONSTRAINING THE DIMENSIONALITY OF THE STRUCTURAL COMPONENTS

Singular values derived in the previous sections are now used to construct new types of design responses for topology optimization. Constraints for local control of structural dimensionality are formulated by means of these responses.

4.1 Eliminating Discontinuities of Singular Values

Singular values $s_k$ for a considered vicinity are discontinuous as their order could switch between the optimization iterations. Therefore, they cannot be used directly in a gradient based optimization algorithm. This is resolved using smooth approximations of maximum and minimum singular values $$s_{smax} = \frac{\sum_{k=1}^{3} s_k e^{p(s_k - r)}}{\sum_{k=1}^{3} e^{p(s_k - r)}} \text{ where } p = 6,$$ (12)

$$s_{smin} = \frac{\sum_{k=1}^{3} s_k e^{p(s_k - r)}}{\sum_{k=1}^{3} e^{p(s_k - r)}} \text{ where } p = 6, \text{ and}$$

$$s_{smid} = \left(\sum_{k=1}^{3} s_k\right) - s_{smax} - s_{smin}.$$

The quantity r is used here to overcome numerical issues for high exponent values and is usually set to $r = s_{max}$ or to $r = s_{min}$ approximating the maximum or the minimum values, respectively.

4.2 Design Responses Based on Singular Values

For a given vicinity of a finite element $i \in \{1, \ldots, n\}$ we consider the three following measures $$\bar{s}_{min}^i = \frac{s_{smin}^i}{s_{max}^i},$$ (13)

$$\bar{s}_{mid}^i = \frac{s_{smid}^i}{s_{max}^i},$$

$$\bar{s}_{mid2max}^i = \frac{s_{smid}^i}{s_{smax}^i}.$$

The quantities on the left side of the first two equations in (13) describe locally the smallest and the second smallest dimensions of structural element, respectively. These quantities are normalized by the maximum possible dimension of the considered vicinity and thereby, invariant with respect to the absolute vicinity size. The third quantity, on the left side of the bottom equation, represents a relation between the second largest dimension and the largest dimension. Note, that this third quantity is per definition a relative quantity and does not directly constrain the denominator in the first two equations of (13). Assume that the design domain consists of all finite elements then the quantities on the left side of the first two equations in (13) are aggregated over all finite elements using smooth maximum approximations as these will be used to formulate less-equal constraints. The quantities represented by the left side of the third equation in (13) are aggregated using smooth minimum approximation as these will be used to formulate greater-equal constraints. With $q \in \{min, mid, mid2max\}$ then the three following design response are introduced:

$$\bar{s}_q = \frac{\sum_{i=1}^{n} \bar{s}_q^i e^{p \bar{s}_q^i}}{\sum_{i=1}^{n} e^{p \bar{s}_q^i}}$$ (14)

where for the following equations:

$n$ = total number of elements, $p = 6$ for $q = $ min or $q = $ mid, and $p = -6$ for $q = $ min2max.

Note, smooth maximum and minimum approximations are used here to obtain just three scalar design responses for the whole design domain. These design responses are applied in the following sections to formulate constraints for the optimization.

4.3 Constraints for Gradient Based Optimization

To locally control the dimensionality of structural elements the following constraints can be formulated.

Locally enforce 1D or 2D structural elements by constraining the smallest dimension. Thereby, 3D fully solid material objects are eliminated for a given vicinity. This is obtained by applying the following constraint $$\bar{s}_{min} \leq \bar{s}_{min}^*$$ (15)

where $0.0 < \bar{s}^*_{min} < 1.0$. This constraint causes the designs to be membrane and lattice like structures and to avoid bulky material concentrations. The value $$\bar{s}_{min}^*$$

implicitly prescribes the maximal thickness of lattice and membrane members relatively to the diameter of the considered vicinity.

Locally enforce 1D structural elements by constraining the smallest and the second smallest dimensions. Thereby, 2D and 3D objects are eliminated for a given vicinity. This is obtained by applying the following constraints $$\bar{s}_{min} \leq \bar{s}_{min}^* \text{ and } \bar{s}_{mid} \leq \bar{s}_{mid}^*$$ (16)

where $0.0 < \bar{s}_{min}^* < 1.0$ and $\bar{s}_{min}^* < \bar{s}_{min}^* < 1.0$.

These constraints cause the designs to be lattice like structures and to avoid bulky material concentrations and membrane like structures. The value $$s_{mid}^*$$

implicitly prescribes the maximal thickness of lattice members relatively to the diameter of the considered vicinity and controls the curvature. If this value is chosen too small the optimizer will not be able to generate joints between 1D components. Sometimes such behavior is intended for example for avoiding fiber crossing in a composite optimization. Increasing the value $$\bar{s}_{mid}*$$

allows curvature of the structural components to be increased,

Locally enforce 2D structural elements by constraining the smallest dimension and the relation between the second largest and the largest dimensions. Thereby, 1D and 3D objects are eliminated. This is obtained by ap-plying the following constraints $$\bar{s}_{min} \leq \bar{s}_{min}* \text{ and } \bar{s}_{mid2max} \geq \bar{s}_{mid2max}* \qquad (17)$$

where $0.0 \leq \bar{s}_{min}* < 1.0$ and $0.5 \leq \bar{s}_{mid2max}* \leq 1.0$.

These constraints cause the designs to be membrane like structures and to avoid bulky material concentrations and lattice like structures. Again, the value $$\bar{s}_{min}*$$

implicitly prescribes the maximal thickness of the membrane components and the value $$\bar{s}_{mid2max}*$$

controls the dimensional proportions normal to the thickness direction. The value $$\bar{s}_{min}*$$

also implicitly controls the curvature of membrane components. Smaller values lead to more planar structures and larger values lead to curved structures.

4.4 Relation Between Relative Material Fraction and Geometrical Control

FIG. 4 to FIG. 11 illustrate that the relative material fraction $f_s$ of the sphere having the radius R is partially related to the geometrical control imposed by constraining the singular values of the decomposition (SVD) for the design variables inside the sphere. The following guidelines for lattice and membrane structures are applied in the present numerical applications in 3D:

Lattice—FIG. 7 and FIG. 8 show certain typical lattice structures obtained constraining the singular values $s_{min}$ and $s_{mid}$ to be less than selected values. Assuming that $$\bar{s} = \bar{s}_{min} = \bar{s}_{mid}$$

and that the volume ($V_{lattice}$) of the lattice member is much smaller than the volume of sphere $V_{sphere} = 4/3\pi R^3$ then the volume of the lattice is given by:

$$V_{lattice} = \pi (R\bar{s})^2 2R.$$

Thereby, the relative material fraction in the sphere is $$f_s = V_{lattice}/V_{sphere} = 3/2\bar{s}^2.$$

Membrane—FIG. 6 and FIG. 7 show certain typical membrane structures obtained constraining the ratio of the singular values $$\bar{s}_{mid2max} = \bar{s}_{mid}/\bar{s}_{max}$$

to be higher than a sudden value, e.g. 0.75. Assuming that the volume of the membrane $V_{membrane}$ is much smaller than the volume of sphere $V_{sphere}$, then the volume of the membrane is given by $V_{membrane} = \pi R^2 t$, where t is the anticipated thickness of membrane structure. Thereby, the relative material fraction in the sphere is $$f_s = \frac{3t}{4R}.$$

Practical membrane structures are often manufactured using deep drawing having a low volume fraction for the design domain, e.g. $f_s = 5\%$ yielding $R = 15t$.

Consequently, if the finite element model for the optimization specifies two elements over the thickness, then the radius includes 30 elements causing the radius to be rather large compared to element sizes for the geometrical control imposing the membrane layout. Note, as described in section 4.3 then the thickness t can be enforced by constraining $$\bar{s}_{min} \text{ yielding } t = \bar{s}_{min} 2R \text{ and thereby, } f_s = 3\bar{s}_{min}/2.$$

4.5 Sensitivity Analysis of SVD Design Responses

The derivatives of design responses $$\bar{s}_q$$

introduced in equation (14) with respect to the relative densities $\rho_e$ is determined for gradient based optimization. The derivation of the corresponding sensitivity relations is based upon multiple applications of chain rule to calculate the derivatives $$\frac{\partial \bar{s}_q}{\partial \rho_e}$$

as pure geometric quantities are considered, and no finite element analysis quantities are involved. In this section, the required partial derivatives are derived.

Derivatives of aggregated design responses with respect to dimensionality measures defined in equation (13) and (14) yield $$\frac{\partial \bar{s}_q}{\partial \bar{s}_q^i} = \frac{(1 + (\bar{s}_q^i - \bar{s}_q)p)e^{p\bar{s}_q^i}}{\sum_j^n e^{p\bar{s}_q^j}} \qquad (18)$$

Derivatives of dimensionality measures with respect to smoothed singular values $s_{smin}$, $s_{smid}$ and $s_{smax}$ de-fined in equation (12) yield $$\frac{\partial \bar{s}_{min}^i}{\partial s_{smin}} = \frac{1}{\hat{s}_{max}^i}, \quad \frac{\partial \bar{s}_{min}^i}{\partial s_{smid}} = 0, \quad \frac{\partial \bar{s}_{min}^i}{\partial s_{smax}} = 0, \qquad (19)$$

$$\frac{\partial \bar{s}_{mid}^i}{\partial s_{smin}} = 0, \quad \frac{\partial \bar{s}_{mid}^i}{\partial s_{smid}} = \frac{1}{\hat{s}_{max}^i}, \quad \frac{\partial \bar{s}_{mid}^i}{\partial s_{smax}} = 0$$

$$\frac{\partial \bar{s}_{mid2max}^i}{\partial s_{smin}} = 0, \quad \frac{\partial \bar{s}_{mid2max}^i}{\partial s_{smid}} = \frac{1}{s_{smax}^i}$$

$$\frac{\partial \bar{s}_{mid2max}^i}{\partial s_{smax}} = -\frac{s_{smid}^i}{(s_{smax}^i)^2}.$$

Derivatives of smoothed singular values with respect to singular values $s_{min}$, $s_{mid}$ and $s_{max}$ defined in equation (11) yield $$\frac{\partial s_{s_{min}}}{\partial s_k} = e^{ps_{min}-r}\left(\sum_k e^{ps_k-r}\right)(1+p(s_k - s_{min})), \quad (20)$$

$$\frac{\partial s_{s_{max}}}{\partial s_k} = e^{ps_{max}-r}\left(\sum_k e^{ps_k-r}\right)(1+p(s_k - s_{max})),$$

$$\frac{\partial s_{s_{mid}}}{\partial s_k} = \sum_k \left(\frac{\partial s_k}{\partial \rho}\right) - \frac{\partial s_{max}}{\partial \rho} - \frac{\partial s_{min}}{\partial \rho}$$

Derivatives of singular values with respect to relative densities $\check{\rho}_j$ are obtained as following $$\frac{\partial s_k}{\partial \check{\rho}_j} = \frac{1}{2\sqrt{\lambda_k}} \frac{\partial \lambda_k}{\partial \check{\rho}_j}, \quad (21)$$

$$\frac{\partial \lambda_k}{\partial \check{\rho}_j} = v_k^T \frac{\partial(\check{C}^T \check{C})}{\partial \check{\rho}_j} v_k.$$

Relations between the quantities $\rho_e$ and $\check{\rho}_j$ can be described by Boolean operators. The corresponding derivatives are straight forward and are not outlined here.

5 EXAMPLES

5.1 A 2D cantilever beam

Figure 20A:
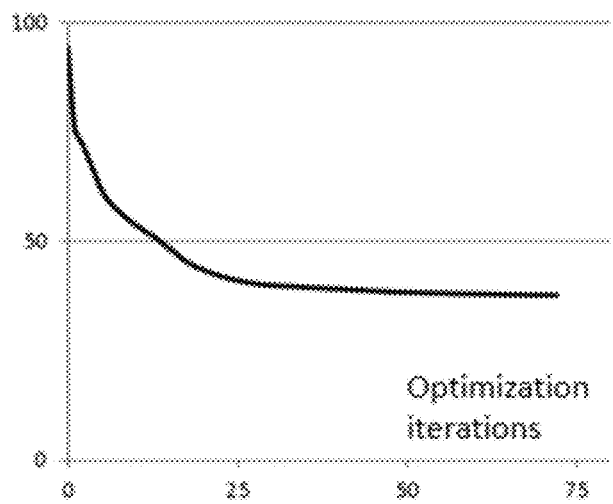
FIG. 20A shows optimization iteration converge history for minimizing compliance.
Figure 20B:
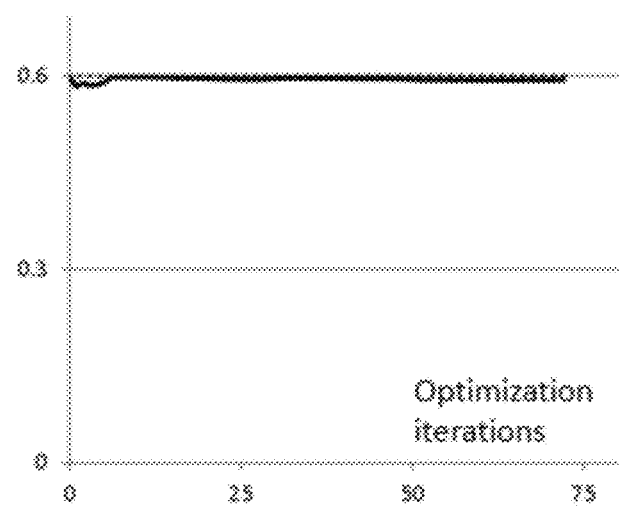
FIG. 20B shows minimizing the compliance subject to a relative mass constraint of 15%.
Figure 20C:
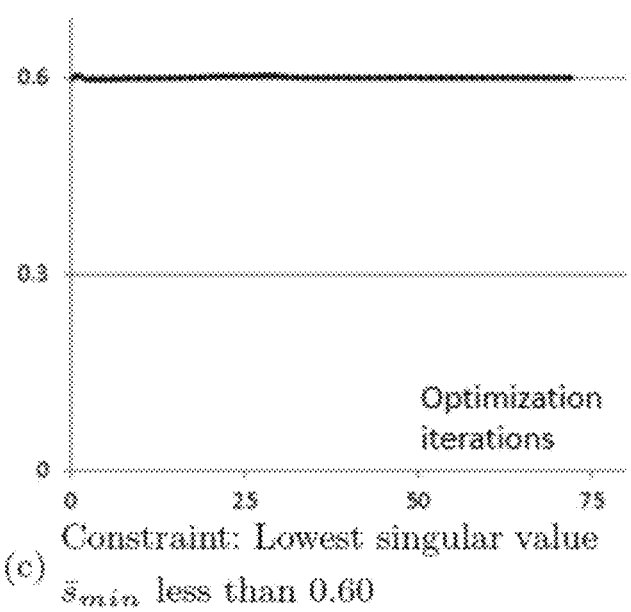
FIG. 20C shows minimizing the compliance subject to an implementation of the techniques presented herein involving constraining the lowest singular value to be less than 0.60 of the decomposition (SVD) of the design variables in a diameter D=12.

A simple 2D example is applied in the following for demonstrating the characteristics of the proposed approach compared to the classical topology optimization. FIG. 19A shows a rectangular 2D design domain discretized by a 400×200 uniform grid using fully integrated four-node plain stress elements in SIMULIA Abaqus (CP4S) with the dimensions 1×1. An elastic material is applied with a Poisson ratio of 0.3. The left edge of the design domain is fully clamped, and an external force is applied to the midpoint at the right edge. FIG. 19B shows the result of the classic topology optimization using a material volume fraction of f=60%. FIG. 19C shows the result of the proposed approach defined in equation (17) constraining the lowest singular value:

$\bar{s}_{min} \leq 0.6$ using a diameter D=12 equivalent to 12 finite elements. This additional constraint is added to the classic topology optimization applied in FIG. 19B. The optimization iteration history is shown in FIG. 20 for the optimization result shown in FIG. 19C. It can be observed that the number of optimization iterations is 73 when applying the additional constraint for lowest singular value. The number of optimization iterations of the design in FIG. 19B is 55. Hence, the optimization convergence iterations are barely impacted by the additional constraint for the lowest singular value $\bar{s}_{min}$ which is also observed for the other numerical experiments.

FIG. 21 show the optimization results when constraining the lowest singular value to be 0.60, 0.50 and 0.40 for a diameter of the included design variables for the decomposition (SVD) being D=12 and D=24, respectively. In FIG. 21, the geometrical dimensionality (a-c) is constraint by the lowest singular value decreases from 0.6 to 0.4 using a diameter of D=12 equivalent to 12 finite elements. Thereby, the member sizes are decreased yielding an increase in compliance C as well as lower relative material volume f The structures (d-f) are optimized using the same constraints of the lowest singular value as for the (a-c) structures but the optimization results are generated using a larger diameter when calculating the lowest singular value of the decomposition (SVD) for the design variables. Comparing (a-c) structures to (d-e) structures show that an increasing diameter for calculating the lowest singular value causes larger member sizes having larger distances between them which results in higher stiffness but also less mass. The applied model mesh, loading and boundary conditions are defined as shown in FIG. 19A. Note, that no symmetry is enforced but the solutions are still prominently symmetrical. Note also, that the optimization in FIG. 21 has no volume constraint applied. One sees that the obtained maximal member sizes are given by "diameter of the included design variables for the decomposition" times "constraint value for lowest singular value." However, small members appear and the length of the sensitivity filter gives the minimum member size.

The present approach seems to have an advantage over the local volume constraint approaches. The lattice members obtained using an approach based only on local volume constraints typically suffer from reducing sizes when approaching intersections and junctions assembling the lattices. However, the results of the present approach seem not to have that drawback.

In FIG. 22, all designs are optimized constraining the lowest singular value to be less or equal to 0.6 using a diameter D=12. The applied model mesh, loading and boundary conditions are shown in FIG. 19A. In FIG. 22A, the design has no volume constraint applied whereas in FIG. 22B-22D, the designs have a volume constraint decreasing from 60% to 40%. In FIG. 23, all designs are optimized constraining the lowest singular value to be less or equal to 0.6 using a diameter D=24. The applied model mesh, loading and boundary conditions are shown in FIG. 19A. In FIG. 23A, the design has no volume constraint applied whereas in FIG. 23B-D the designs have a volume constraint decreasing from 60% to 40%.

Figure 22A:
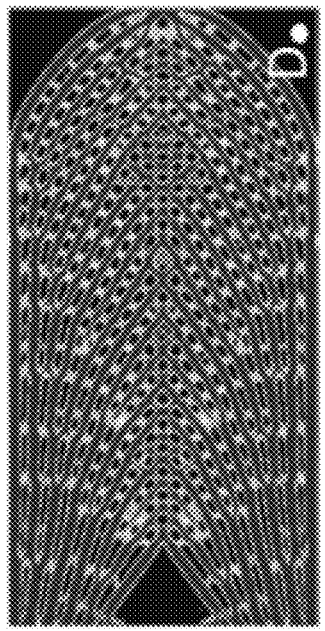
FIG. 22A-22D shows other exemplary optimization results.
Figure 22B:
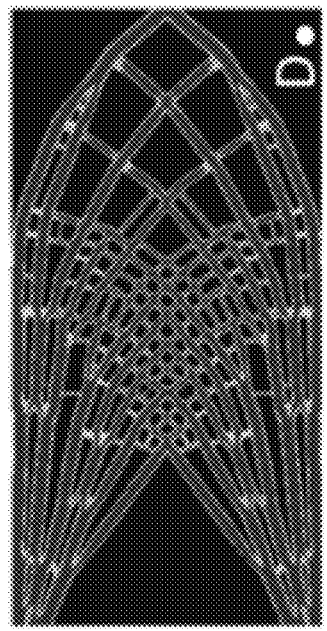
Figure 22C:
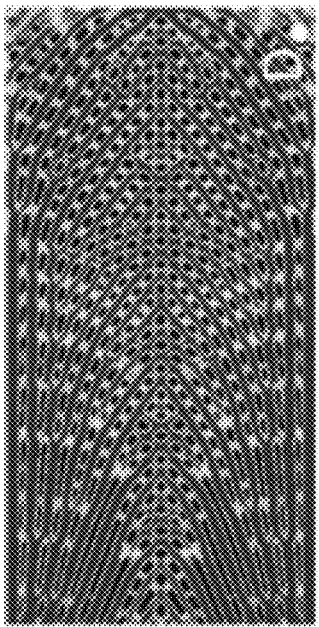
Figure 22D:
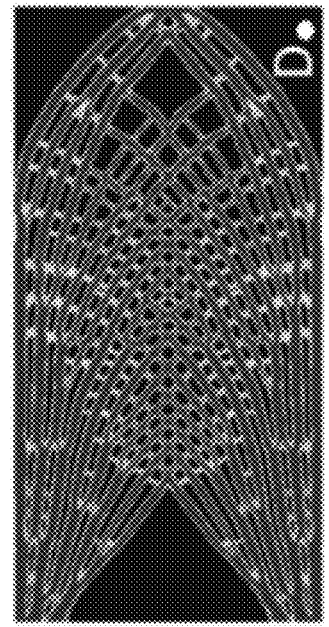
Figure 23B:
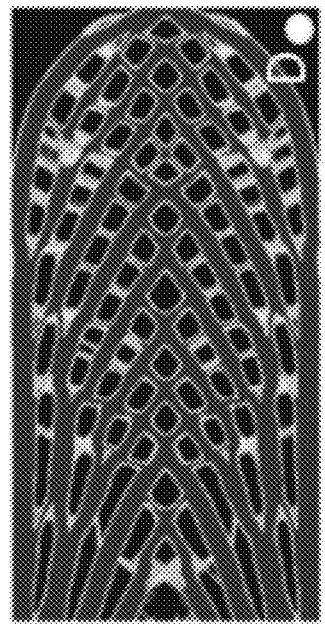
FIG. 23A-23D shows still other exemplary optimization results.
Figure 23D:
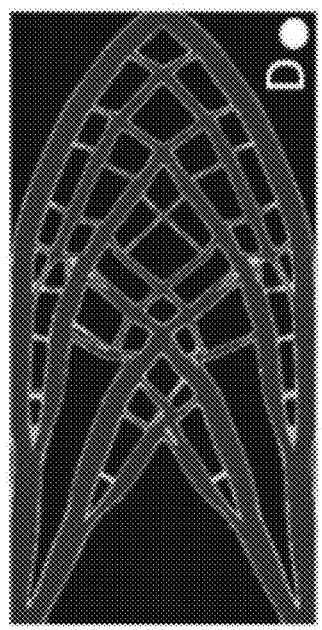
Figure 23A:
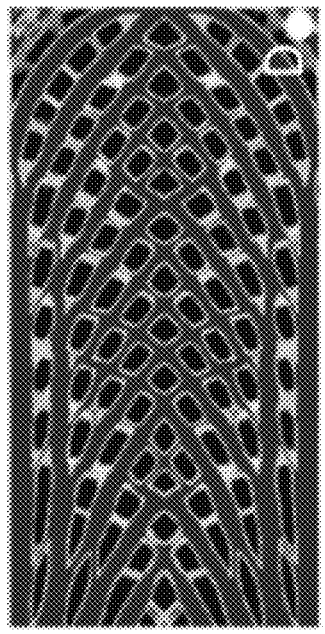
Figure 23C:
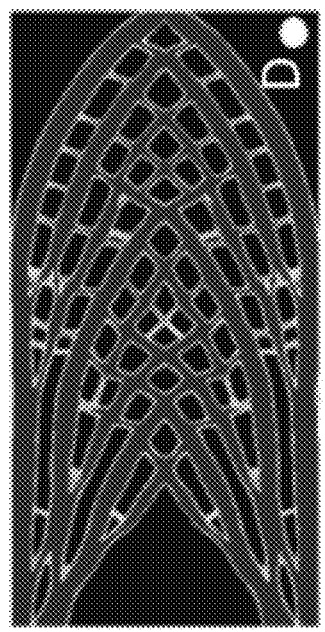

FIGS. 22 and 23 show the effect of adding a global volume constraint to the optimization formulation compared the designs in FIGS. 22(a) and 23(a), respectively. Generally, one sees that the classic volume constraint for topology optimization works well when also constraining the lowest singular value. The material volumes of the designs shown in FIGS. 22(a) and 23(a) optimized without material volume constraints are just slightly higher than the constraining value of the lowest singular value. However, these designs have some intermediate densities for the low strain energy density areas of the design domain. FIGS. 22(b) and 23(b) show that by adding a volume constraint similar to the constraint value of the lowest singular value these intermediate densities are removed.

FIGS. 22 and 23 show the result of the proposed approach defined in equation (17) constraining the lowest singular value then we yield designs having satisficing solid\void representation in a fairly low number of optimization iterations and most important objective function values of the compliance being almost similar to the objective values without the volume constraints. Therefore, the present results in figure FIGS. 22 and 23 as well as additional numerical experiments indicate that for obtaining solid\void 2D optimization solutions then one should apply a volume constraint being the same or lower than the constraint for the lowest singular value.

5.2 Bone Infill Design

Figure 24:
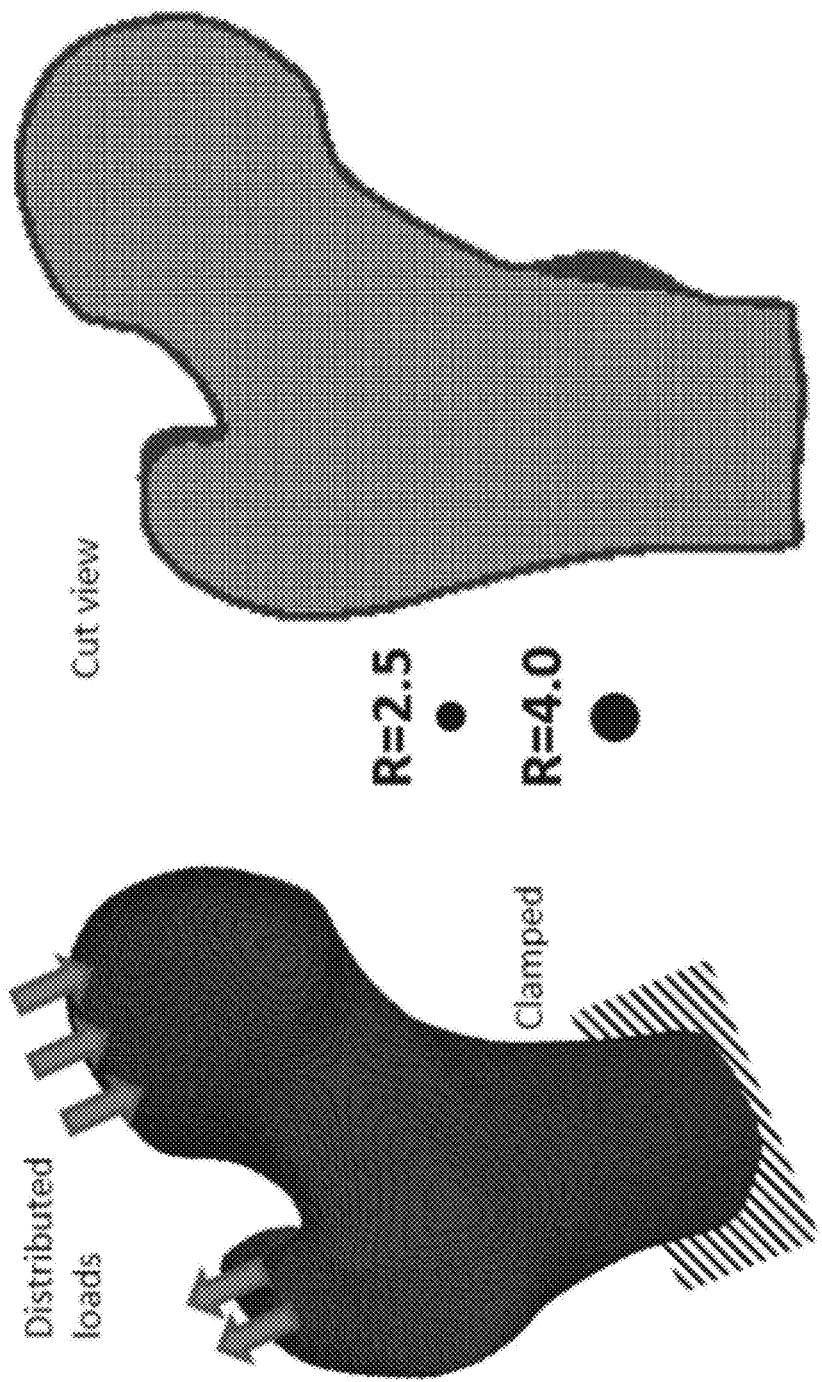
FIG. 24 represents an exemplary femur finite element model.

The present section addresses the possibility of generating a lattice infill structure and membrane infill structures for a femur, respectively. The femur finite element model, represented in FIG. 24, consists of 1090793 hexahedral elements (C3D8) each having the size 1×1×1 yielding 3420603 DOFs being solved using an iterative algebraic multigrid solver. An elastic material is applied having a Poisson ratio of 0.3. The 3D femur model is fully clamped at the bottom and two-point forces applied at the top are displayed in their initial state. The elements at the outer surface are not a part of the design domain in this example.

Figures 25A, 25B, 25C, 25D, 25E:
FIG. 25A-25E show exemplary topology optimized infill designs for a femur.

FIG. 25A-25E show topology optimized infills for a femur using a relative material mass fraction of 0.50. The outer surface is not a part of the design domain. FIG. 25A represents classic stiffness optimization subject to a mass constraint. FIGS. 25B and 25 C represent topology optimization obtaining membrane infills by geometrical constraining $$\overline{s}_{min}$$

to be less than 0.5 for a radius of 2.5 (in FIG. 25B) and 4.0 (in FIG. 25C), respectively.

FIGS. 25D and 25E represent topology optimization obtaining lattice infills by geometrical constraining $$\overline{s}_{min}$$

to be less than 0.5 and $$\overline{s}_{mid}$$

to be less than 0.6 for a radius of 2.5 (in FIG. 25D) and 4.0 (in FIG. 25E), respectively.

FIG. 25A shows the standard topology optimization result maximizing the stiffness subject to a relative volume constraint of 0.50 but no additional constraints. The same relative volume constraint value is applied for the following numerical experiments, but additional constraints are added for the $$\overline{s}_{min} \text{ and } \underline{s}_{mid}, \text{ respectively.}$$

These constraining singular values are estimated to be around 0.58 using the lattice approximation for f=0.50, as out-lined in section 4.4.

Only the first singular value is constrained to be 0.50 for the optimization results shown for R=2.5 in FIG. 25B and for R=4.0 in FIG. 25C, respectively. The results shown in FIG. 25B and FIG. 25C consist mainly of membrane components having the thickness $$2R\overline{s}_{min}$$

as infill for the femur which is expected as membrane components are stiffer than lattice structures. Additionally, the membrane components obtained in FIG. 25B and FIG. 25C are rather similar to certain prior results presented in using local volume constraint also yielding membrane like structures for the infill of the femur. Thus, the present membrane designs obtained using a single constraint for the first singular value and the previous reported designs in using a local volume constraint would not be feasible for having blood diffusing through the structure transporting the nutrition as well as being infeasible for many Additive Manufacturing processes based upon powder as the powder would be trapped inside the design after printing.

Subsequently, we constraint both the first singular value to be 0.50 and the second singular value to be 0.60 for enforcing a design having lattice infill components as shown in FIG. 15(d) and FIG. 15(e), respectively. The optimized results in FIG. 15D and FIG. 15E have distinct lattice components as infill compared to the membrane infill results in FIG. 15B and FIG. 15C. However, the membrane infill structures have around 20% higher stiffness than the lattice infill structures for both a radius of R=2.5 and R=4.0, respectively. Consequently, the present geometrical dimensionality control allows us to both obtain membrane designs similar to solutions obtained using local volume constraint but also importantly to obtain designs being true lattice designs having open cell structures. Thereby, the present approach for geometrical dimensionality control achieves open lattice cell structures, which are feasible for Additive Manufacturing (AM) with respect to getting the powder out after manufacturing as well as allowing another media to flow through the optimized structures.

A number of embodiments of the invention have been described. Nevertheless, it will be understood that various modifications may be made without departing from the spirit and scope of the invention.

For example, some of the implementations disclosed herein can be targeted to addressing sensitivity-based solutions for structural optimization disciplines as topology optimization, shape optimization, sizing optimization and bead optimization. However, the techniques are not theoretically limited to structural optimization disciplines, but also are valid for example to multiphysics optimization such as computational fluid dynamics (CFD), thermo-mechanical, electro-mechanical and fluid-structural, where the values from a singular value decomposition (SVD) of the design variables (DV) can be determined and used to define additional constraints to enforce geometrical features.

It should be understood that the example embodiments described herein may be implemented in many different ways. In some instances, the various methods and machines described herein may each be implemented by a physical, virtual, or hybrid general purpose computer, such as the computer system, or the computer network environment described herein. The computer system may be transformed into the machines that execute the methods described herein, for example, by loading software instructions into either memory or non-volatile storage for execution by the CPU. One of ordinary skill in the art should further understand that the system and its various components may be configured to carry out any embodiments or combination of embodiments of the present invention described herein. Further, the system may implement the various embodiments described herein utilizing any combination of hardware, software, and firmware modules operatively coupled, internally, or externally, to or incorporated into the system. Further, the system may be communicatively coupled to or be embedded within a manufacturing device and be configured so as to control the device to create a physical object as described herein.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification (e.g., those represented in FIG. 3A, 3B, 15, and otherwise disclosed herein) can be implemented as operations performed by a data processing apparatus (e.g., a processor/specially-programmed processor) on data stored on one or more computer-readable storage devices or received from other sources, such as the computer system and/or network environment in FIGS. 1 and 2. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. A computer-implemented method of automatically determining an optimized topology design for manufacturing a real-world object, the method comprising:
   defining, in memory of a computer-based processor, a finite element model representing a real-world object, the finite element comprising a plurality of elements;
   evaluating, with the computer-based processor, a distribution of a design variable throughout a vicinity of the finite element model to produce a singular value for the design variable in each respective element in the vicinity of the finite element model;
   defining optimization constraints for the vicinity of the finite element model based on the singular value for the design variable in each respective element in the vicinity of the finite element model; and
   optimizing topology of the finite element model with respect to the design variable by locally enforcing a geometry of the real-world object in the vicinity based on the defined optimization constraints,
   wherein the finite element model having the optimized topology is digitally communicable to a real-world machine capable of manufacturing the real-world object based on the finite element model with the optimized topology.

2. The computer-implemented method of claim 1, further comprising:
   updating a property of a given one of the elements in the finite element model to reflect the optimized design variable, thereby creating an optimized model of the real-world object for manufacturing.

3. The computer-implemented method of claim 2, further comprising:
   determining, with the computer-based processor, whether optimization has converged; and
   depending on an outcome of the computer-based processor's determination:
   starting a new optimization cycle; or
   creating a final optimized design,
   wherein the computer-based processor determines that the optimization has converged if constraints for associated design responses have been fulfilled and if an associated objective function has been optimized.

4. The computer-implemented method of claim 2, further comprising:
   causing the real-world object to be manufactured according to the final optimized design.

5. The computer-implemented method of claim 1, wherein the design variable represents relative density, and wherein design responses represent compliance, stiffness, stress, strain, force, modal eigenfrequency, and/or other typical structural design responses.

6. The computer-implemented method of claim 1, wherein defining the optimization constraints comprises:
   applying, with the computer-based processor, a smoothing approximation function to each of the singular values produced from the SVD to produce smoothed approximations;

identifying, with the computer-based processor, additional values by performing an SVD where all elemental design variable values are set to a predetermined value; and calculating the optimization constraints utilizing the smoothed approximations and the additional values.

7. The computer-implemented method of claim 1, wherein evaluating the distribution of the design variable throughout the vicinity of the finite element model, using singular value decomposition (SVD), comprises, using the computer-based processor to:

read data, from the memory of the computer-based processor, representing a geometrical description of the finite element model from memory;

solve equilibriums of the finite element model based on the data;

model design responses and equilibrium design responses and associated sensitivities with respect to the design variable based on the data; and determine design responses and sensitivities of calculated singular values for geometrical dimensionality control with respect to design variables.

8. The computer-implemented method of claim 7, wherein defining the optimization constraints comprises:

applying, with the computer-based processor, the design responses to define an optimization problem consisting of constraints to be fulfilled and an objective function to optimized.

9. The computer-implemented method of claim 8, wherein defining the optimization constraints further comprises:

solving the optimization problem with the computer-based processor using an optimization computation based upon user-defined values of design targets, design responses, and sensitivities of the design responses.

10. The computer-implemented method of claim 1, further comprising:

manufacturing the real-world object, with a real-world machine capable of manufacturing the real-world object, based on the finite element model with the optimized topology.

11. The computer-implemented method of claim 10, digitally communicating the finite element model having the optimized topology to the real-world machine.

12. The computer-implemented method of claim 11, wherein the real-world machine is an additive manufacturing machine, a stamping machine, or a computer numerical control (CNC) machine.

13. The computer-implemented method of claim 12, wherein the singular values comprise three singular values ($s_{min}$, $s_{mid}$, and $s_{max}$) for each vicinity of the finite element model, and wherein optimizing the topology of the finite element model produces an optimized version of the finite element model, the method further comprising:

eliminating hollow and enclosed structural parts from the manufactured real-world object by constraining a first pair of the three singular values ($s_{min}$ and $s_{mid}$); or enforcing a sheet-manufactured design having a membrane layout for the manufactured real-world object by constraining a second pair of the three singular values ($s_{max}$ and $s_{mid}$).

14. A computer-based system for automatically determining an optimized topology design for manufacturing a real-world object, the computer-based system comprising:

a computer-based processor; and computer-based memory coupled to the computer-based processor, wherein computer-based memory stores data that defines a finite element model representing a real-world object, the finite element comprising a plurality of elements, and wherein the computer-based memory stores computer-readable instructions that, when executed by the computer-based processor, cause the computer-based processor to:

evaluate a distribution of a design variable throughout a vicinity of the finite element model to produce a singular value for the design variable in each respective element in the vicinity of the finite element model;

define optimization constraints for the vicinity of the finite element model based on the singular value for the design variable in each respective element in the vicinity of the finite element model; and optimize topology of the finite element model with respect to the design variable by locally enforcing a geometry of the real-world object in the vicinity based on the defined optimization constraints, wherein the finite element model having the optimized topology is digitally communicable to a real-world machine capable of manufacturing the real-world object based on the finite element model with the optimized topology.

15. The computer-based system of claim 14, wherein the computer-based memory stores further computer-readable instructions that, when executed by the computer-based processor, cause the computer-based processor to:

update a property of a given one of the elements in the finite element model to reflect the optimized design variable, thereby creating an optimized model of the real-world object for manufacturing.

16. The computer-based system of claim 15, wherein the computer-based memory stores further computer-readable instructions that, when executed by the computer-based processor, cause the computer-based processor to:

determine whether optimization has converged; and depending on an outcome of the determination:

start a new optimization cycle; or create a final optimized design, wherein the computer-based processor determines that the optimization has converged if constraints for associated design responses have been fulfilled and if an associated objective function has been optimized.

17. The computer-based system of claim 16, wherein the computer-based memory stores further computer-readable instructions that, when executed by the computer-based processor, cause the computer-based processor to:

cause the real-world object to be manufactured according to the final optimized design.

18. The computer-based system of claim 14, wherein the design variable represents relative density and wherein a design response represents compliance, stiffness, stress, strain, force, modal eigenfrequency, and/or other typical structural design responses.

19. The computer-based system of claim 14, wherein the instructions that cause the computer-based processor to define the optimization constraints, further comprise instructions that cause the computer-based processor to:

apply a smoothing approximation function to each of the singular values produced from the SVD to produce smoothed approximations;

identify, with the computer-based processor, additional values by performing an SVD where all elemental design variable values are set to a predetermined value; and calculate the optimization constraints utilizing the smoothed approximations and the additional values.

20. The computer-based system of claim 14, wherein the instructions that cause the computer-based processor to evaluate the distribution of the design variable throughout the vicinity of the finite element model, using singular value decomposition (SVD), further comprise instructions that cause the computer-based processor to:

read data, from the memory of the computer-based processor, representing a geometrical description of the finite element model from memory;

solve equilibriums of the finite element model based on the data;

model design responses and equilibrium design responses and associated sensitivities with respect to the design variable based on the data; and determine design responses and sensitivities of calculated singular values for geometrical dimensionality control with respect to design variables.

21. The computer-based system of claim 20, wherein the instructions that cause the computer-based processor to define the optimization constraints further comprise instructions that cause the computer-based processor to:

apply the design responses to define an optimization problem consisting of constraints to be fulfilled and an objective function to optimized.

22. The computer-based system of claim 21, wherein the instructions that cause the computer-based processor to define the optimization constraints further comprise instructions that cause the computer-based processor to:

solve the optimization problem with the computer-based processor using an optimization computation based upon user-defined values of design targets, design responses, and sensitivities of the design responses.

23. The computer-based system of claim 14 further comprising:

a real-world machine capable of manufacturing the real-world object, based on the finite element model with the optimized topology, wherein the computer-based processor and the computer-based memory are communicatively coupled to or embedded within the real-world machine.

24. A non-transitory computer readable medium having stored thereon computer-readable instructions that, when executed by a computer-based processor, causes the computer-based processor to:

evaluate a distribution of a design variable throughout a vicinity of the finite element model, using singular value decomposition (SVD), to produce a singular value for the design variable in each respective element in the vicinity of the finite element model;

define optimization constraints for the vicinity of the finite element model based on the singular values produced from the SVD; and optimize topology of the finite element model with respect to the design variable by locally enforcing a geometry of the real-world object in the vicinity based on the defined optimization constraints, wherein the finite element model having the optimized topology is digitally communicable to a real-world machine capable of manufacturing the real-world object based on the finite element model with the optimized topology.

25. The non-transitory computer program product of claim 24, wherein the computer readable medium further comprises computer-readable instructions that, when executed by the computer-based processor, causes the processor to:

updating a property of a given one of the elements in the finite element model to reflect the optimized design variable, thereby creating an optimized model of the real-world object for manufacturing.

26. A method comprising automatically determining an optimized topology design for manufacturing a real-world object, the method comprising:

in a computer or computer system:

defining, in memory of a computer-based processor, a finite element model representing a real-world object, the finite element comprising a plurality of elements;

evaluating, with the computer-based processor, a distribution of a design variable throughout a vicinity of the finite element model to produce a singular value for the design variable in each respective element in the vicinity of the finite element model;

defining optimization constraints for the vicinity of the finite element model based on the singular values; and optimizing topology of the finite element model with respect to the design variable by locally enforcing a geometry of the real-world object in the vicinity based on the defined optimization constraints, to produce a version of the finite element model having the optimized topology; and digitally communicating data describing the version of the finite element model having the optimized topology from the computer or the computer system to a real-world machine capable of manufacturing the real-world object based on the version of the finite element model having the optimized topology; and manufacturing the real-world object based on the version of the finite element model having the optimized topology.

* * * * *